US012596729B2

(12) United States Patent
Poroor et al.

(10) Patent No.: US 12,596,729 B2
(45) Date of Patent: Apr. 7, 2026

(54) VALUE-DIRECTED PARSING FOR DATA EXTRACTION

(71) Applicant: Zoho Corporation Private Limited, Kanchipuram District (IN)

(72) Inventors: Jayaraj Poroor, Thrissur (IN); Harish Chandrasekar Reddy, Chennai (IN); Raghul Selvaraj, Coimbatore (IN); Bharath Sivakumar, Guduvanchery (IN)

(73) Assignee: Zoho Corporation Private Limited, Kanchipuram District (IN)

( * ) Notice: Subject to any disclaimer, the term of this patent is extended or adjusted under 35 U.S.C. 154(b) by 0 days.

(21) Appl. No.: 18/416,957

(22) Filed: Jan. 19, 2024

(65) Prior Publication Data

US 2024/0265039 A1     Aug. 8, 2024

Related U.S. Application Data

(60) Provisional application No. 63/498,096, filed on Apr. 25, 2023.

(30) Foreign Application Priority Data

Feb. 6, 2023     (IN) .............................. 202341007494

(51) Int. Cl.
     *G06F 16/31* (2019.01)
(52) U.S. Cl.
     CPC ................................. *G06F 16/313* (2019.01)

(58) Field of Classification Search
     None
     See application file for complete search history.

(56) References Cited

U.S. PATENT DOCUMENTS

| | | | | |
|---|---|---|---|---|
| 12,008,029 | B1* | 6/2024 | Kim ......................... | G06F 16/38 |
| 2010/0122161 | A1* | 5/2010 | Jardine-Skinner .... | G06F 40/103 |
| | | | | 715/256 |
| 2012/0011084 | A1 | 1/2012 | Gulwani et al. | |
| 2012/0089614 | A1* | 4/2012 | Hamilton .............. | G06F 16/215 |
| | | | | 707/E17.084 |
| 2012/0201457 | A1* | 8/2012 | Bart ....................... | G06V 30/40 |
| | | | | 382/176 |
| 2016/0117293 | A1* | 4/2016 | Dettman ............... | G06F 16/254 |
| | | | | 715/234 |

(Continued)

OTHER PUBLICATIONS

Artale, "Compilers Lecture VIII—Semantic Analysis: Syntax Directed Translation," Free University of Bolzano—Formal Languages and Compilers. Lecture VIII, 2012/2013 (43 Pages).

(Continued)

*Primary Examiner* — Kannan Shanmugasundaram
(74) *Attorney, Agent, or Firm* — Silicon Edge Law Group LLP; Arthur J. Behiel

(57) ABSTRACT

Described are methods and systems for parsing unstructured or semi-structured text to extract named entities, data types defined to include semantic fields. Fields are constrained to sets of potential field values. These sets can overlap, leading to ambiguous parses. For example, the text string "3-4-2023" parsed as a date can yield Mar. 4, 2023 or Apr. 3, 2023. Potential field values in alternative parses are scored and the scores used to select and disambiguate the resultant value parses.

15 Claims, 7 Drawing Sheets

(56)                References Cited

U.S. PATENT DOCUMENTS

2020/0057806 A1     2/2020  Bhutani
2020/0394398 A1*  12/2020  Pamarthi ............... G06F 16/345

OTHER PUBLICATIONS

Howtogeek, "How to Fill Excel Cells Automatically with Flash Fill and Auto Fill," howtogeek.com/715978/how-to-fill-excel-cells-automatically-with-flash-fill-and-auto-fill, Mar. 26, 2021 (7 pages).
Maggie Johnson, "Syntax Directed Translation," CS143 Summary 2012, Handout 16, Jul. 11, 2012 (8 pages).
Jurafsky and Martin, "Context-Free Grammars and Constituency Parsing," Chapter 17 of Speech and Language Processing, Jan. 7, 2023 (26 pages).
Marsh, "semantic.dates," pythonhosted.org/semantic/dates.html, Semantic 1.0 documentation, 2014 (3 pages).
Microsoft, "Using Flash Fill in Excel," support.microsoft.com/en-us/office/using-flash-fill-in-excel-3f9bcf1e-db93-4890-94a0-1578341f73f7, circa 2013 (1 page).

Morris, "Data Parsing: Definition, Technologies, and Use Cases," coresignal.com/blog/data-parsing, Oct. 30, 2020 (9 pages).
Nasre, "Syntax Directed Translation," CS3300 Compiler Design, IIT Madras, Aug. 2015 (35 pages).
Wanasit, "wanasit/chrono: A natural language date parser in Javascript," github.com/wanasit/chrono, circa 2014 (9 pages).
Wikipedia, "Named-entity recognition," Retrieved from https://en.wikipedia.org/w/index.php?title=Named-entity_recognition&oldid=1131238105, last edited on Jan. 3, 2023, at 05:56 (7 pages).
Wikipedia, "Syntactic parsing (computational linguistics)," https://en.wikipedia.org/w/index.php?title=Syntactic_parsing_(computational_linguistics)&oldid=1136388204, last edited on Jan. 30, 2023, at 02:30 (7 pages).
Wikipedia, "Unstructured data," https://en.wikipedia.org/w/index.php?title=Unstructured_data&oldid=1133968256, last edited on Jan. 16, 2023, at 10:29 (5 pages).
Intellectual Property India, "Examination report under sections 12 & 13 of the Patents Act, 1970 and the Patents Rules, 2003," with mailing date Jun. 30, 2025 in IN Appln. No. 202341007494. 6 pages.

* cited by examiner

VALUE-DIRECTED PARSING FOR DATA EXTRACTION

CROSS-REFERENCE TO RELATED APPLICATIONS

This application claims the benefit of Indian Provisional Application No. 202341007494 filed 6 Feb. 2023 and U.S. Provisional Application No. 63/498,096 filed 25 Apr. 2023, both of which are incorporated by reference herein in their entirety.

TECHNICAL FIELD

This disclosure relates to named-entity recognition, a form of information extraction that classifies unstructured or semi-structed text.

BACKGROUND

Free-form text parsing is a process of extracting structured information from unstructured or semi-structured text. An important subset of text parsing is named-entity recognition (NER), a process that seeks to identify and classify named entities like people, organizations, locations, medical codes, time expressions, quantities, monetary values, and percentages. For example, "In India, Independence Day is 15 August." Both "India" and "15 August" are named entities because they refer to specific instances; however, "Independence Day" is not a named entity because it can be used to refer to many instances (e.g., 4 July in the United States or 24 August in Ukraine).

A challenge in free-form text parsing is that named entities can be ambiguously specified. Independence Day in the United States, for example, might be written as July $4^{th}$, 7/4, 0704, or 0407. Moreover, named entities, including dates, can be expressed using different forms or formats within the same text or collection of texts. If one were to make a spreadsheet listing the Independence days celebrated around the world, for example, data collected expressing those days would likely be formatted in many ways. The year values may not be included, and if so, may be expressed as two digits or four; the month and day values can be spelled out or enumerated using one or two digits; and the order of the day, month, and year values can differ. There is therefore a need for systems and methods for recognizing and formatting named entities from unstructured or semi-structured text.

SUMMARY

Unstructured or semi-structured text is converted to structured information, a target value parse with semantic fields. For example, the semi-structured text string "31-03" can be parsed to a named entity of a datatype "date" that includes semantic fields "month" and "day" to give a target value parse of {'month': 03, 'day': 31}. The parsing tokenizes the text string and applies value constraints to each token, thus arriving at potential field values. The potential field values and combinations of potential field values are then scored. The combination of potential field values with the highest score points to the target value parse. Equally scored value parses can be disambiguated using techniques that bias the ordering of fields toward learnt orderings or bias the orderings toward an induced format. Value parses can also be disambiguated by comparing them to reference value parses extracted from reference output text.

BRIEF DESCRIPTION OF THE DRAWINGS

The accompanying drawings are illustrative and not limiting. The left-most digit(s) of a reference number identifies the figure in which the reference number first appears.

DETAILED DESCRIPTION

Figure 1:
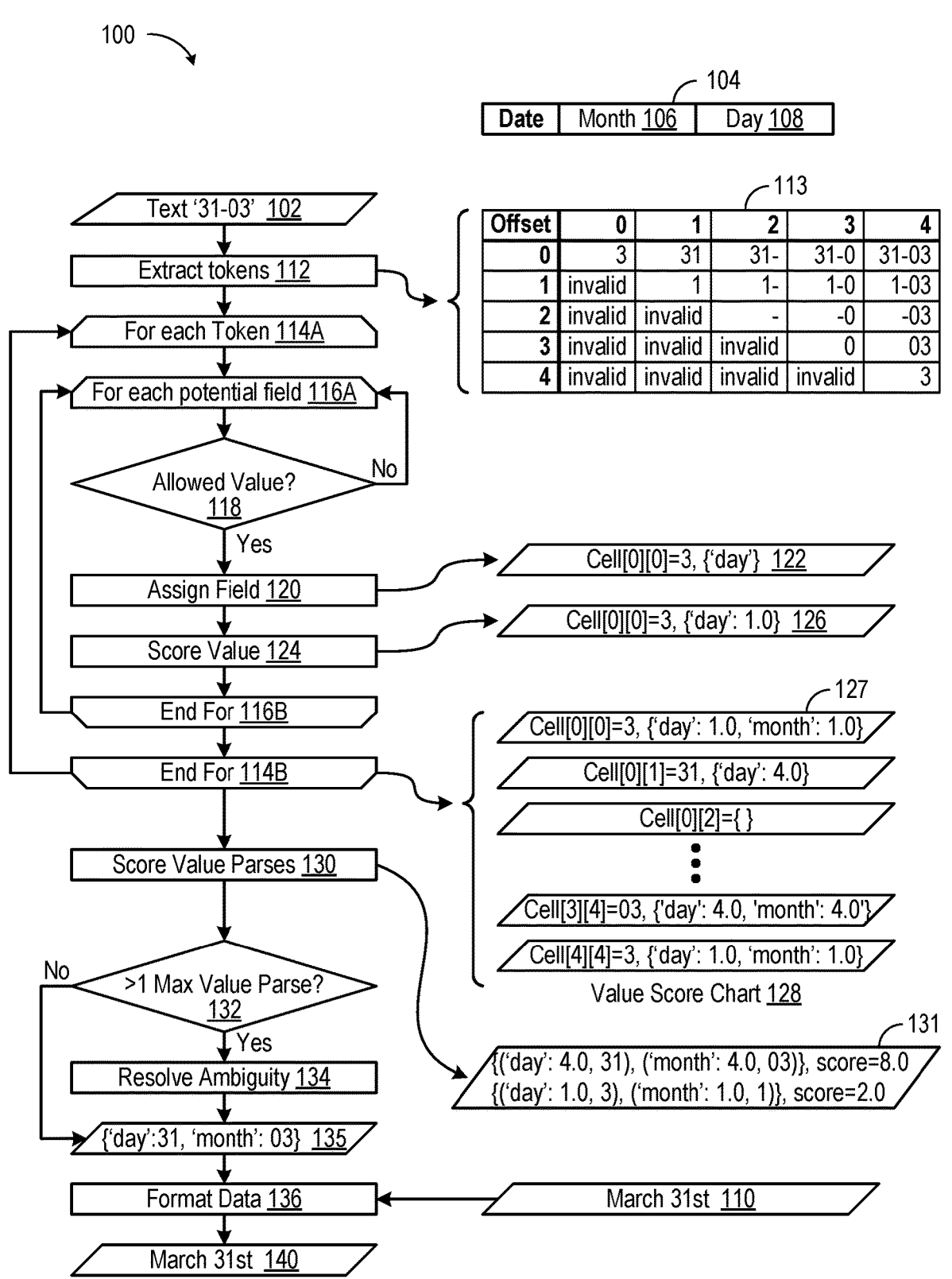
FIG. 1 is a flowchart 100 depicting a method of parsing an unstructured or semi-structured text string 102 to extract structured data.

FIG. 1 is a flowchart 100 depicting a method of parsing an unstructured or semi-structured text string 102 to extract structured data. Flowchart 100 illustrates this parsing by converting a semi-structured text string "31-03" to a named entity of a datatype "date" 104 defined to include an ordered pair of semantic fields, "month" 106 and "day" 108. Fields 106 and 108 are constrained to corresponding sets of field values. These sets overlap leading to some ambiguity. For example, the value "03" can represent a day or a month. The illustrated method tokenizes text string 102 and applies scores to tokens and combinations of tokens to find the only or most-likely values for fields 106 and 108 and outputs one or more value parses, e.g. {day:31, month:03} for text string "31-03". An optional reference output 110 (lower right) can specify a desired format for text string 31-03 and subsequently extracted date entities. For example, a user might specify "March 31 st" for value parse {day:31, month:3} to induce a spreadsheet to normalize all date value parses in the same manner. The text string "24/7/1776" would thus be automatically parsed to {day:24, month:7} and formatted as "July 24th".

Parsing begins by extracting tokens from text string 102 "31-03" (112). Five index positions [0:4], one for each of the five characters "31-03" of text string 102, are used to populate a table 113 that lists every possible left-to-right string of one or more characters. Next, as represented by a for-loop 114A/B, each token of table 113, is scored. To do so, a second for-loop 116A/B determines whether each token meets value constraints placed on month field 106 or day field 108 of datatype 104. In general, semantic fields are constrained to sets of semantically related items. In this example, values for month field 106 are constrained to month names, the first three letters of month names, and one or two-digit integers from one to twelve; and values for day field 108 are constrained to one or two-bit integers from one to thirty-one, and can include suffixes (e.g., $1^{st}$, $2^{nd}$, and $3^{rd}$).

Per decision 118, a cell in which the token is not an allowed value for the field under consideration is considered for the next field. The token "31", for example, is not allowed for month field 106 but is allowed for day field 108. If the token is disallowed for all fields, the cell is marked null. For example, token "31-0" of cell[0][3] does not meet the value constraints for either a month or a day and would thus be marked "null." A cell in which the token is allowed for one or more fields is assigned the field (120) and the token is scored (124). Considering cell[0][0], the token "3" meets the requirements of field "day" so cell[0][0] is marked "day" (122). The value for day is marked 1.0 (126), the score calculated in this example by squaring the number of digits in the token. The token "3" in cell[0][0] also meets the requirements of field "month" so cell[0][0] is also marked "month" and the month value likewise scored a value of 1.0 by the end of for-loop 114A/B (127). Nested for-loops 114A/B and 116A/B eventually produce a value score chart 128, abbreviated in FIG. 1, for each cell of table 113. The following Table 1A shows each entry of value score chart 128.

TABLE 1A

Value Score Chart 128 for "31-03"

| offset | 0 | 1 | 2 | 3 | 4 |
|---|---|---|---|---|---|
| 0 | {'day': 1.0, 'month': 1.0} token: "3" | {'day': 4.0} token: "31" | { } | { } | { } |
| 1 | None | {'day': 1.0, 'month': 1.0} token: "1" | { } | { } | { } |
| 2 | None | None | { } | { } | { } |
| 3 | None | None | None | { } | {'day': 4.0, 'month': 4.0} token: "03" |
| 4 | None | None | None | None | {'day': 1.0, 'month': 1.0} token: "3" |

The following Table 1B lists each entry of value score chart 128 with an initial score calculation for at least one of fields 106 and 108 to illustrate how cells get their {'field', score} values. As shown, only five of the tokens listed in table 113 might be field values for a named entity of date datatype 104, and four of these field values can represent day or month values. Only token "31" of cell[0][1] is unambiguous.

TABLE 1B

Initial Score Calculation for Valid Tokens

| Cell | Token | Length | Potential Field | Score {'field', score} |
|---|---|---|---|---|
| cell[0][0] | 3 | 1 | d (or) m | 1.0 {'day': 1.0, 'month': 1.0} |
| cell[0][1] | 31 | 2 | d | 4.0 {'day': 4.0} |
| cell[1][1] | 1 | 1 | d (or) m | 1.0 {'day': 1.0, 'month': 1.0} |

TABLE 1B-continued

Initial Score Calculation for Valid Tokens

| Cell | Token | Length | Potential Field | Score {'field', score} |
|---|---|---|---|---|
| cell[3][4] | 03 | 2 | d (or) m | 4.0 {'day': 4.0, 'month': 4.0} |
| cell[4][4] | 3 | 1 | d (or) m | 1.0 {'day': 1.0, 'month': 1.0} |

The rightmost column of Table 1B includes the field and its score for each cell of Table 113 that contains a potentially valid field value. Value score chart 128, the complete contents of which is shown in Table 1A, is obtained using the calculation in Table 1B. Each cell in Table 1B lists the possible field and its score for an allowed token. A scoring mechanism (130) applied to the allowed tokens of Table 1B results in value parses. This example produces a set of two value parses: Parse1: {('day': 4.0, 31), ('month': 4.0, 03)} and Parse2: {('day': 1.0, 3), ('month': 1.0, 1)}. In step 130, each value parse is scored by summing the scores for the field or fields to yield scores 131. For Parse1, 'day' score+'month' score=4.0+4.0=8.0; for Parse2, 'day' score+'month' score=1.0+1.0=2.0.

Per decision 132, if there is more than one maximum value parse, then the process can take steps to resolve the ambiguity (134). Disambiguation can be performed using techniques such as learnt orderings, format induction, combined-value parsing, and neighboring parses, embodiments of which are detailed below. In this example, however, scores 131 includes an unambiguous maximum value parse of eight. Text string 102 is thus unambiguously interpreted as "day"=31 and "month"=03, which can be expressed as a maximum value parse 135 of {'day': 31, 'month': 03}. In step 136, a format is extracted from reference output 110 and applied to the maximum value parse 135 and output as structured data 140. Structured data 140 matches reference output 110 in this example. However, subsequent and different unstructured dates would produce different structured data with the same induced format. For example, subsequently following flowchart 200 for text input "28-02" would produce a value parse of {'day': 28, 'month': 02} and structured data of "February 28th".

Step 130, scoring value parses, can be carried out using a beam-search algorithm. Staying with the example of text string "31-03", the values of Table 1A are represented as a list data structure in a beam initialization chart shown below as Table 2. Each value is a potential field value associated with one or both of month field 106 and day field 108 of date datatype 104, and each potential field is accompanied by a score. For example, cell [0][0] maps to the same cell in Table 1 Table 2 and includes the value '3', meaning that the token '3' is potentially a value for day or month. Each potential value is provided a score that is a function of the number of characters, the square of the character length in this example. Cell [0][0] has one character, '3', for example, and so is scored as $1.0^2=1.0$ for each of potential fields 'day' and 'month'. Score values include a decimal to distinguish them from tokens. For example, cell [1][1] includes a potential field value of "1" that provides a score of 1.0 for each of month field 106 and day field 108. Cells without potential field values are marked as containing an empty list ([ ]).

TABLE 2

| | | | | | |
|---|---|---|---|---|---|
| | Beam Initialization Chart for Token "31-03" | | | | |
| Offset | 0 | 1 | 2 | 3 | 4 |
| 0 | [{'day': 1.0}, {'month': 1.0}] value: 3 | [{'day': 4.0}] value: 31 | [ ] | [ ] | [ ] |
| 1 | None | [{'month': 1.0}, {'day': 1.0}] value: 1 | [ ] | [ ] | [ ] |
| 2 | None | None | [ ] | [ ] | [ ] |
| 3 | None | None | None | [ ] | [{'month': 4.0}, {'day': 4.0}] value: 03 |
| 4 | None | None | None | None | [{'month': 1.0}, {'day': 1.0}] value: 3 |

The beam initialization chart of Table 2 is input to a beam search algorithm in which the beam width is two. Best-score value parses are obtained for the rows of Table 2 giving a beam-optimization chart provided below as Table 3. Each best-score value parse is in the format: {field: (score, value) }. For example, the best-score value parses for the token '31' is in cell[0][1] and is given as: [{'d': (4.0, 31)}, {'m': (1.0, 3), 'd': (1.0, 1)}], wherein 'month' and 'day' are shortened to 'm' and 'd' for brevity.

TABLE 3

| | | | | | |
|---|---|---|---|---|---|
| | Beam Optimization Chart with Best-Score Value Parses | | | | |
| Offset | 0 | 1 | 2 | 3 | 4 |
| 0 | 1 [{'m': (1.0, 3)}, {'d': (1.0, 3)}] | 3 [{'d': (4.0, 31)}, {'m': (1.0, 3), 'd': (1.0, 1) }] | 6 [{'d': (4.0, 31)}, {'m': (1.0, 3), 'd': (1.0, 1)}] | 10 [{'d': (4.0, 31)}, {'m': (1.0, 3), 'd': (1.0, 1)}] | 15 [{'d': (4.0, 31), 'm': (4.0, 03)}, {'d': (4.0, 31), 'm': (1.0, 3)}] |
| 1 | None | 2 [{'m': (1.0, 1)}, {'d': (1.0, 1)}] | 5 [{'m': (1.0, 1)}, {'d': (1.0, 1)}] | 9 [{'m': (1.0, 1)}, {'d': (1.0, 1)}] | 14 [{'m': (1.0, 1), 'd': (4.0, 3)}, {'d': (1.0, 1), 'm': (4.0, 03)}] |
| 2 | None | None | 4 [ ] | 8 [ ] | 13 [{'m': (4.0, 03)}, {'d': (4.0, 03)}] |
| 3 | None | None | None | 7 [ ] | 12 [{'m': (4.0, 03)}, {'d': (4.0, 03)}] |
| 4 | None | None | None | None | 11 [{'m': (1.0, 3)}, {'d': (1.0, 3)}] |

The cells of Table 3 are updated from the corresponding cells of Table 2 in the order noted in the upper left of each cell of Table 3 (e.g., cell[0][0], cell[1][1], cell[0][1] . . . cell[1][4], cell[0][4]). The following discussion details each update in that order.

Update 1: Cell[0][0] has the initial token value "3", appearing as both a potential month and a potential day, and is not updated.

Update 2: Cell[1][1] has the initial token value "1", appearing as both a potential month and a potential day, and is not updated.

Update 3: Cell[0][1] has token value "31", which can be split into a substring pair Pair 1: cell[0][0] and cell[1][1]. To calculate the value for cell[0][1] using Pair 1:

a. current_beam=cell[0][1]=[{'d': (4.0, 31)}];

b. left_beam=cell[0][0]=[{'m': (1.0, 3)}, {'d': (1.0, 3)}];

c. right_beam=cell[1][1]=[{'m': (1.0, 1)}, {'d': (1.0, 1)}];

d. Merge left and right beams merged_beam=
[
{'m': (1.0, 3), 'd': (1.0, 1)},
{'m': (1.0, 3)},
{'d': (1.0, 3), 'm': (1.0, 1)},
{'d': (1.0, 3)},
{'m': (1.0, 1), 'd': (1.0, 3)},
{'m': (1.0, 1)},
{'d': (1.0, 1), 'm': (1.0, 3)}

{'d': (1.0, 1)}
]

e. Combine current_beam and merged_beam
[
{'d': (4.0, 31)},
{'m': (1.0, 3), 'd': (1.0, 1)},
{'m': (1.0, 3)},
{'d': (1.0, 3), 'm': (1.0, 1)},
{'d': (1.0, 3)},
{'m': (1.0, 1), 'd': (1.0, 3)},
{'m': (1.0, 1)},
{'d': (1.0, 1), 'm': (1.0, 3)}
{'d': (1.0, 1)}
]

f. Remove duplicates
[
{'d': (4.0, 31)},
{'m': (1.0, 3), 'd': (1.0, 1)},
{'m': (1.0, 3)}, {'d': (1.0, 3), 'm': (1.0, 1)},
{'d': (1.0, 3)},
{'m': (1.0, 1)},
{'d': (1.0, 1)}
]

g. Sort based on total score (total score=sum of scores of all fields in a parse)

[
{'d': (4.0, 31)},
{'m': (1.0, 3), 'd': (1.0, 1)},
{'d': (1.0, 3), 'm': (1.0, 1)},
{'m': (1.0, 3)},
{'d': (1.0, 3)},
{'m': (1.0, 1)},
{'d': (1.0, 1)}
]

h. Select the value parses based on beam_width (Here, beam width=2)

[
{'d': (4.0, 31)},
{'m': (1.0, 3), 'd': (1.0, 1)}
]

i. Update cell[0][1]: Value in Cell[0][1] after update is [{'d': (4.0, 31)}, {'m': (1.0, 3), 'd': (1.0, 1)}]

Update 4: Cell[2][2] contains token: "-" (visible in Table 113 of FIG. 1) and cannot be split into substring pairs. So, there is no update to this cell. The empty set from Table 2 is retained.

Update 5: Cell[1][2] contains token: "1-" (visible in Table 113 of FIG. 1) and can be split into substring pairs. Pair 1: cell[1][1]="1" and cell[2][2]="-".

a. current_beam=cell[1][2]=[ ]

b. left_beam=cell[1][1]=[{'m': (1.0, 1)}, {'d': (1.0, 1)}]

c. right_beam=cell[2][2]=[ ]

d. Merge left and right beams merged_beam=

[
{'m': (1.0, 1)},
{'d': (1.0, 1)}
]

e. Combine current_beam and merged_beam

[
{'m': (1.0, 1)},
{'d': (1.0, 1)}
]

f. Remove duplicates

[
{'m': (1.0, 1)},
{'d': (1.0, 1)}
]

g. Sort based on total score (total score=sum of scores of all fields in a parse)

[
{'m': (1.0, 1)},
{'d': (1.0, 1)}
]

h. Select the value parses based on beam_width (Here, beam width=2)

[
{'m': (1.0, 1)},
{'d': (1.0, 1)}
]

i. Update cell[1][2] to [{'m': (1.0, 1)}, {'d': (1.0, 1)}].

Update 6: Cell[0][2] contains token: "31-", which can be split into two substring pairs, Pair 1: cell[0][0]="3" and cell[1][2]="1-"; and Pair 2: cell[0][1]="31" and cell[2][2]="-".

To calculate the value for cell[0][2] using Pair 1:

a. current_beam=cell[0][2]=[ ];

b. left_beam=cell[0][0]=[{'m': (1.0, 3)}, {'d': (1.0, 3)}];

c. right_beam=cell[1][2]=[{'m': (1.0, 1)}, {'d': (1.0, 1)}];

d. Merge left and right beams;

e. Combine current_beam and merged_beams;

f. Remove duplicates;

g. Sort based on total score (total score=sum of scores of all fields in a parse);

h. Select the value parses based on beam_width (Here, beam width=2); and i. Update cell[0][2]=[{'m': (1.0, 3), 'd': (1.0, 1)}, {'d': (1.0, 3), 'm': (1.0, 1)}].

To calculate the value for cell[0][2] using Pair 2:

a. current_beam=cell[0][2]=[{'m': (1.0, 3), 'd': (1.0, 1)}, {'d': (1.0, 3), 'm': (1.0, 1)}] (Note: this value parse is updated in the previous Pair 1 calculation);

b. left_beam=cell[0][1]=[{'d': (4.0, 31)}, {'m': (1.0, 3), 'd': (1.0, 1)}];

c. right_beam=cell[2][2]=[ ];

d. Merge left and right beams;

e. Combine current_beam and merged_beam;

f. Remove duplicates;

g. Sort based on total score (total score=sum of scores of all fields in a parse);

h. Select the value parses based on beam_width (Here, beam width=2); and i. Update cell[0][2] Value in Cell[0][2] after update is [{'d': (4.0, 31)}, {'m': (1.0, 3), 'd': (1.0, 1)}].

Update 7: Cell[3][3] contains token: "0", cannot be split into substring pairs, and is not updated. The empty set from Table 2 is retained.

Update 8: Cell[2][3] contains token: "–0" and has no initialized value. The cell can be split into substring pair cell[2][2] and cell[3][3], but the values of cell[2][2] and cell[3][3] are [ ] so there is no update to cell[2][3]. The empty set from Table 2 is retained.

Update 9: Cell[1][3] contains token: "1-0", which can be split into substring pairs Pair 1: cell[1][1] and cell[2][3]; and Pair 2: cell[1][2] and cell[3][3]. The value in cell[1][3] after update is [{'m': (1.0, 1)}, {'d': (1.0, 1)}].

Update 10: Cell[0][3] contains token: "31-0" and can be split into three substring pairs:

Pair 1: cell[0][0] and cell[1][3]; Pair 2: cell[0][1] and cell[2][3]; and Pair 3: cell[0][2] and cell[3][3]. The value in cell[0][3] after update is [{'d': (4.0, 31)}, {'m': (1.0, 3), 'd': (1.0, 1)}].

Update 11: Cell[4][4] contains token: "3" and has its initialized value. The initial score of 1.0 is retained as the final score in the cell. So, there is no update to this cell.

Update 12: Cell[3][4] contains token:"3" and can be split into substring pair Pair 1: cell[3][3] and cell[4][4]. The value in Cell[3][4] after update is [{'m': (4.0, 03)}, {'d': (4.0, 03)}].

Update 13: Cell[2][4] contains token: "–03" and can be split into substring pairs: Pair 1: cell[2][2] and cell[3][4]; and Pair 2: cell[2][3] and cell[4][4]. The value in cell[2][4] after update is: [{'m': (4.0, 03)}, {'d': (4.0, 3)}].

Update 14: Cell[1][4] contains token: "1-03" and can be split into substring pairs: Pair 1: cell[1][1] and cell[2][4]; Pair 2: cell[1][2] and cell[3][4]; and Pair 3: cell[1]

[3] and cell[4][4]. The value in cell[1][4] after update is: [{'m': (1.0, 1), 'd': (4.0, 03)}, {'d': (1.0, 1), 'm': (4.0, 03)}].

Update 15: Cell[0][4] contains token: "31-03" and can be split into substring pairs: Pair 1: cell[0][0] and cell[1][4]; Pair 2: cell[0][1] and cell[2][4]; Pair 3: cell[0][2] and cell[3][4]; and Pair 4: cell[0][3] and cell[4][4]. The value in cell[0][4] after update is: [{'d': (4.0, 31), 'm': (4.0, 03)}, {'d': (4.0, 31), 'm': (1.0, 3)}].

With reference to Table 3, the optimal-score value parses (or value parses) appear in cell [0][4]: [{'d': (4.0, 31), 'm': (4.0, 03)}, {'d': (4.0, 31), 'm': (1.0, 3)}], where: Parse-1={'d': (4.0, 31), 'm': (4.0, 03)} and Parse-2={'d': (4.0, 31), 'm': (1.0, 3)}. The total score of Parse-1 is {'d': (4.0, 31), 'm': (4.0, 03)}=4+4=8.0; and of parse-2 is {'d': (4.0, 31), 'm': (1.0, 3)}=4+1=5.0.

With reference to decision 132 of FIG. 1, there is no ambiguity. Only Parse-1 has the highest score of 8.0. Parse-1 is the selected as the target value parse and text string '31-03' is represented as {'day': 31, 'month': 03} (135).

Figure 2:
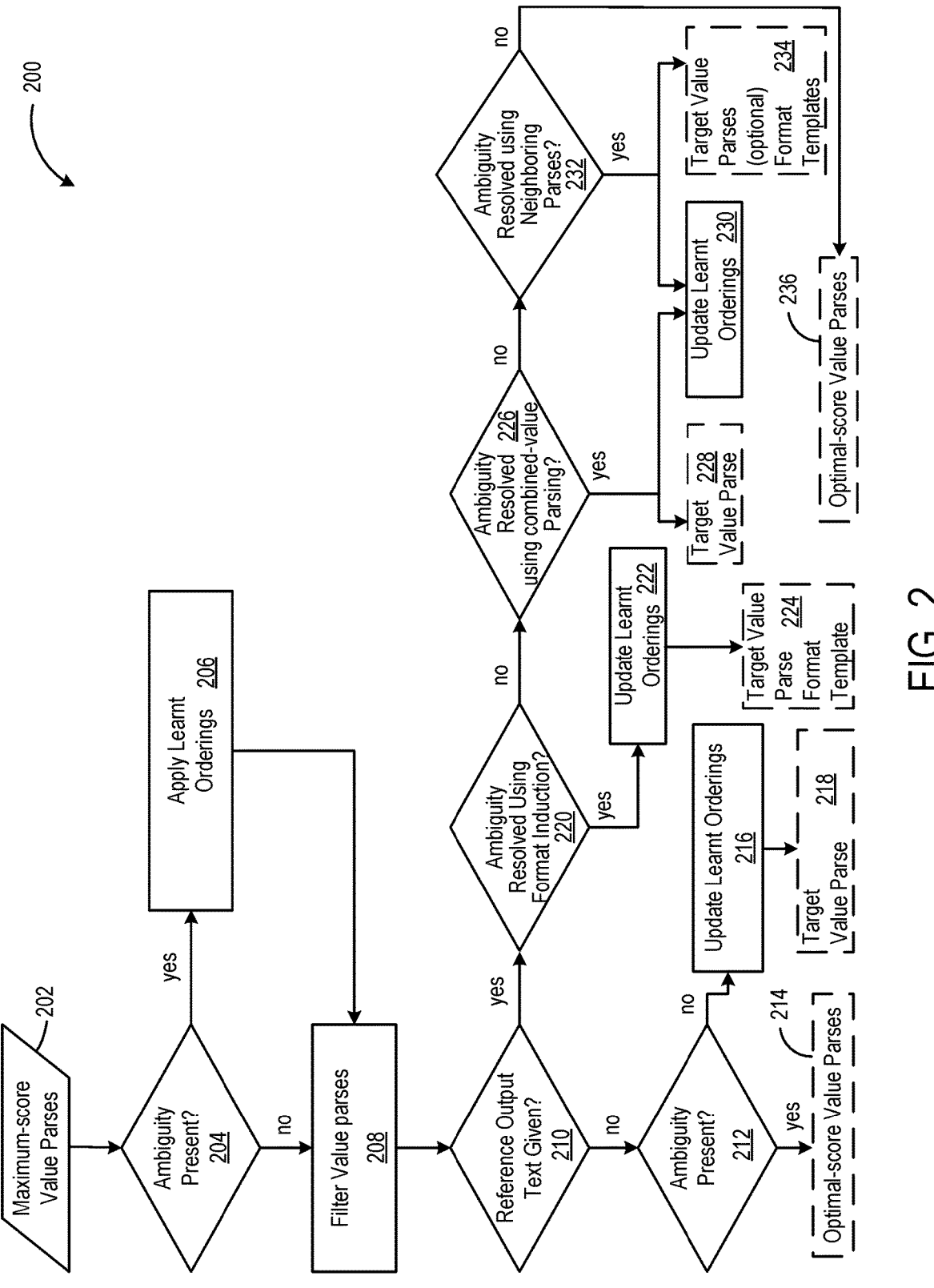
FIG. 2 is a flowchart 200 illustrating a process for selecting between equivalent maximum value parses, and thus disambiguating proposed parses of unstructured text.

FIG. 2 is a flowchart 200 illustrating a process for selecting between equivalent maximum value parses, and thus disambiguating proposed parses of unstructured text. For example, assume an input text string of 1-2-2022 that presumably represents a date. Both "1" and the "2" are allowed values for both day and month. The process of FIG. 1 thus provides the following ambiguous pair of maximum value parses:

$$\text{Parse-}A = [\{'day': 1(1.0)\}, \{'month': 2(1.0)\},$$
$$\{'year': 2022(16.0)\}] = 1.0 + 1.0 + 16.0 = 18.0.$$
$$\text{Parse-}B = [\{'month': 1(1.0)\}, \{'day': 2(1.0)\},$$
$$\{'year': 2022(16.0)\}] = 1.0 + 1.0 + 16.0 = 18.0.$$

These parses, each yielding a maximum value parse of 18, cannot be distinguished based on score alone. The method of flowchart 200 resolves this ambiguity.

The process begins when multiple maximum-score value parses 202 are produced for a given text string. Per decision 204, a learnt ordering is applied (206) to ambiguous parses 202. The application of learnt orderings applies biases to field scores in a manner that favors one field order, e.g. field order dd-mm-yyyy over field order mm-dd-yyyy.

The following Table 4 is a weight matrix that can be applied to ambiguous date value parses to bias them in favor of preferred field order dd-mm-yyyy. Weights capture this bias with positive values for field pairs dd:mm, dd:yyyy, mm:yyyy, and negative values for field pairs mm:dd, yyyy:dd, yyyy:mm. In this example, values of 0.2 and −0.2 are assigned to preferred and non-preferred orderings, respectively. Diagonal elements represent prohibited field orderings and are assigned a value of zero.

TABLE 4

Learnt Orderings Weight Matrix for fields of 'date' datatype

| field | dd | mm | yyyy |
|---|---|---|---|
| dd | 0 | 0.2 | 0.2 |
| mm | −0.2 | 0 | 0.2 |
| yyyy | −0.2 | −0.2 | 0 |

Weight matrices of the type illustrated in Table 4 are created with the fields of a reference datatype (e.g. fields 106 and 108 of datatype 104). If a reference datatype is not given, a preferred order of occurrence of fields in a datatype can be automatically generated based on context, e.g. using context information identified from the data source like session identifier, geographic location, personalized data, the application of the datatype. For example, one or number of unambiguous spreadsheet entries can be considered to find a preferred order for ambiguous entries in the same spreadsheet, or more broadly to e.g. the same user, organization, or region.

The following Table 5 shows field orderings of Parse-A={'day': 1 (1.0)}, {'month': 2 (1)}, {'year': 2022 (16.0)}]. In Parse-A, day comes before month and year, so pairs dd:mm and dd:yyyy are positive; month comes after day, so field mm:dd is negative, and before year, so field mm:yyyy is positive; and year comes after both day and month, so fields yyyy:dd and yyyy:mm are negative.

TABLE 5

Orderings Matrix for Parse-A = {'day': '1', 'month': '2', 'year': 2022}

| field | dd | mm | yyyy |
|---|---|---|---|
| dd | 0 | + | + |
| mm | − | 0 | + |
| yyyy | − | − | 0 |

The following Table 6 combines the learnt orderings of Table 4 with the field ordering of Parse-A as noted in Table 5.

TABLE 6

Combined Matrices for Learnt Orderings and Parse-A

| field | dd | mm | yyyy |
|---|---|---|---|
| dd | 0 | +0.2 | +0.2 |
| mm | −(−0.2) = +0.2 | 0 | +0.2 |
| yyyy | −(−0.2) = +0.2 | −(−0.2) = +0.2 | 0 |

Applying the weights of Table 4 to value Parse-A={'day': '1', 'month': '2', 'year':2022} of Table 5 proceeds as follows:

a. Day Score: To update the score for 'day': {'day': 1 (1.0)}, combine the weight matrix of Table 4 with the day (dd) cells of Table 5. All four day fields dd:mm, dd:yyyy, mm:dd, and yyyy:dd are +0.2, so the offset is (0.2+0.2+0.2+0.2)=0.8. Adding this to the initial day score of 1.0 gives 1.0+0.8=1.8.

b. Month Score: To update the score for 'month': {'month': 2 (1.0)}, combine the weight matrix of Table 4 with the month (mm) cells of Table 5. All four month fields mm:dd, mm:yyyy, dd:mm, and mm:dd are +0.2, so the offset is 0.8. Adding this to the initial month score of 1.0 gives 1.0+0.8=1.8.

c. Year Score: To update the score for 'year': {'year': 2022 (16.0)}, combine the weight matrix of Table 4 with the year (yyyy) cells of Table 5. All four year fields yyyy:dd, yyyy:mm, mm:yyyy, and dd: yyyy are +0.2, so the offset is 0.8. Adding this to the initial year score of 16 gives 16.0+0.8=16.8.

The updated total score for Parse-A=updated score for 'day'+updated score for 'month'+updated score for 'year'=1.8+1.8+16.8=20.4. The biases applied by Table 4 thus increase the total score of Parse-A from 18.0 to 20.4.

The following Table 7 shows field orderings of Parse-B={'month': 1 (1.0)}, {'day': 2 (1)}, {'year': 2022 (16.0)}]. In Parse-B, day comes before year, and month comes before day and year, so fields dd:yyyy, mm:dd, and mm:yyyy are positive and fields dd:mm, yyyy:dd, and yyyy:mm are negative.

TABLE 7

| Orderings Matrix for Parse-B = {'month': '1', 'day': '2', 'year': 2022} | | | |
| --- | --- | --- | --- |
| field | dd | mm | yyyy |
| dd | 0 | – | + |
| mm | + | 0 | + |
| yyyy | – | – | 0 |

The following Table 8 combines the learnt orderings of Table 4 with the field ordering of Parse-B as noted in Table 7.

TABLE 8

| Combined Matrices for Learnt Orderings and Parse-B | | | |
| --- | --- | --- | --- |
| field | dd | mm | yyyy |
| dd | 0 | –0.2 | +0.2 |
| mm | +(–0.2) = –0.2 | 0 | +0.2 |
| yyyy | –(–0.2) = +0.2 | –(–0.2) = +0.2 | 0 |

Applying the Biases of Table 4 to Parse-B of Table 8:
  a. Month Score: To update the score for 'month': {'month': 1 (1.0)}, fields mm:dd=–0.2, mm:yyyy=0.2, dd:mm=–0.2, and yyyy:mm=0.2. The offset is the sum, or 0.0. Adding this to the initial month score of 1.0 gives 1.0+0.0=1.0.
  b. Day Score: To update the score for "day': {'day': 2 (1.0)}, fields dd:mm=–0.2, dd:yyyy=+0.2, mm:dd=–0.2, yyyy:dd=+0.2. The sum is 0.0. Adding this to the initial day score of 1.0 gives 1.0+0.0=1.0.
  c. Year Score: To update the score for 'year': {'year': 2022 (16.0)}, fields yyyy:dd=0.2, yyyy:mm=0.2, dd:yyyy=0.2, and mm:yyyy=0.2, which sum to 0.8. Adding this to the initial year score of 16.0 gives 16.0+0.8=16.8.

The updated total score for Parse-B is 1.0+1.0+16.8=18.8. Parse-A, having the higher score of 20.4, becomes the preferred value parse.

Returning to FIG. 2, the one or more of the maximum value parses are filtered in step 208. Filtering excludes value parses that are incompatible with any reference output text provided for the input text string. The resulting parse or parses are passed as input to decision 210. If no reference output text is given, and the parses from step 208 are ambiguous, then decision 212 guides the process to output the top optimal-score value parses (214). If there is no ambiguity at decision 212, the process updates the learnt orderings (216) to be applied in step 206 for later text strings. In Table 4, for example, the listed bias levels can be adjusted by a hyperparameter known as "delta" to increase the overall bias in favor of the field order expressed in the unambiguous value parse. The process also outputs the unambiguous target value parse (218). The update of step 216 can be carried out before, during, or after delivery of the target value parse.

Returning to decision 210, if a reference output text is available, such as an exemplar from a user or prior entry in a spreadsheet, then the highest-scored value parses from step 208 are passed to the next stage. Per decision 220, ambiguity between value parses can be resolved using format induction. Format induction generates format templates with respect to the value parses. A format template is a collection of field formatters used to standardize the format of the data types for the value parses. A format may, for example, specify that dates are to be output in the format of dd-mm-yy, the day, month, and year, meaning that the field formatters specify that days be represented in order using two numerical characters and separated by dashes (e.g. Jan. 31, 2022=>31-01-22). All possible field formats are generated for the single/multiple value parses. If the field formats of one of the value parses matches the format of the reference output text, the learnt orderings are updated (222) and both the target value parse and the format of the reference output text are provided (224). The score for the target value parse can also be included.

When ambiguity is not resolved by format induction, decision 220 passes the process to combined-value parsing. The reference output text is parsed using the steps of potential field identification and value-score optimization to get one or more output value parse. Each output value parse is compared with each of the multiple optimal-score value parses to select the parse for which all the fields match. If a match is found, it implies that ambiguity is resolved and the respective input value parse becomes the optimal-score value parse (228). This optimal-score value parse is termed as the target value parse in this stage. It is also used to update the learnt orderings (230). If a match is not found, then an empty set is returned and the process moves to decision 232, a neighboring-parses stage.

Neighboring parses are the maximum value parse and one or more others with values that lie within a threshold of the maximum value. In one embodiment, the threshold selects the top n (where n denotes beam width) neighboring value parses with the highest scores; up to two hundred of the highest-scored value parses are considered. All possible field formats are generated for the neighboring value parses. If the field formats of the neighboring value parses match with the format of the reference output text, then the learnt orderings are updated (230) and a format template is obtained (234). If unresolved ambiguity remains, some or all the highest-scored value parses from step 208 are output (236).

Figure 3A:
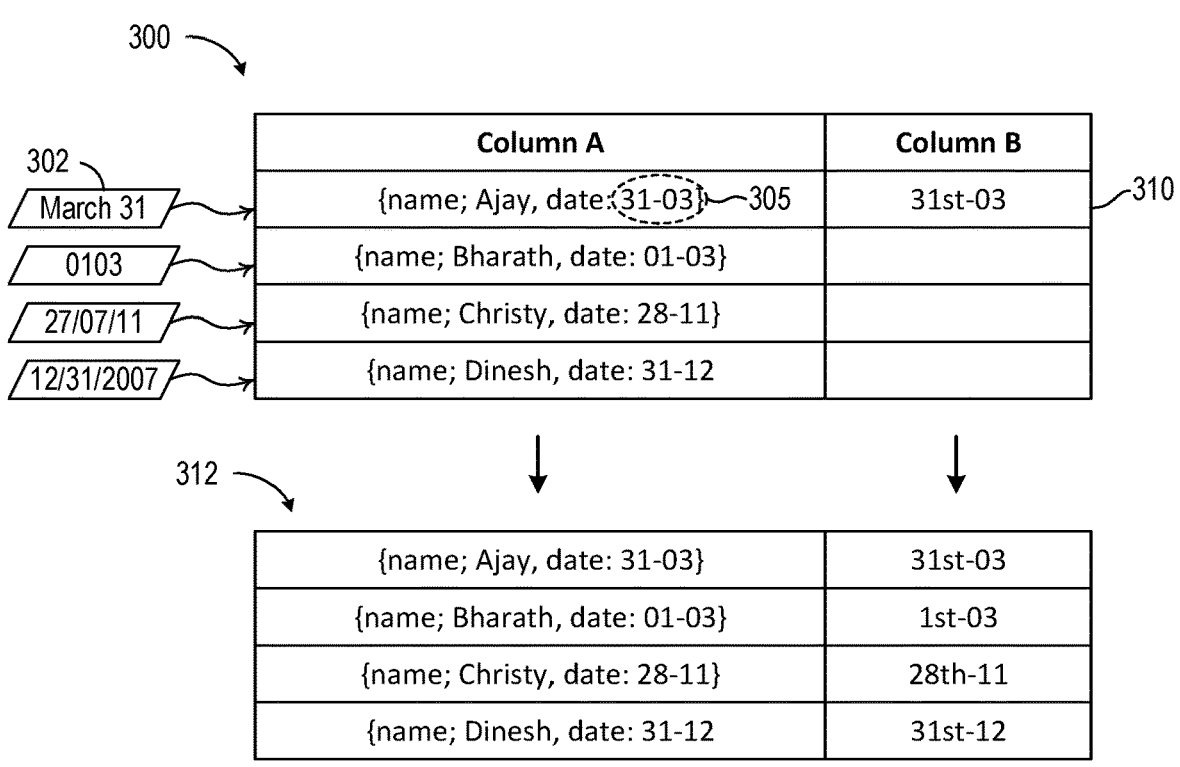
FIG. 3A depicts a spreadsheet 300 with two columns A and B. Column A includes names each associated with a date value parse in the form {'day', 'month' }.

FIG. 3A depicts a spreadsheet 300 with two columns A and B. Column A includes names each associated with a date value parse in the form {'day', 'month'}. The date parses are arrived at from date information conveyed in a variety of formats. In the uppermost row, for example, a text string 302 of "March 31" converted to a value parse 305 of "31-03". Column B is meant to include the date entries from column A in a format directed by a user. To this end, the user has added reference output text 310, an exemplar in the desired format with first and second reference field values "31$^{st}$" and "3". A process of format induction extracts a format template from reference output text 310. As depicted in an updated flowchart 312, the format template is then automatically applied to the remaining value parses to populate the remaining cells of column B.

Figure 3B:
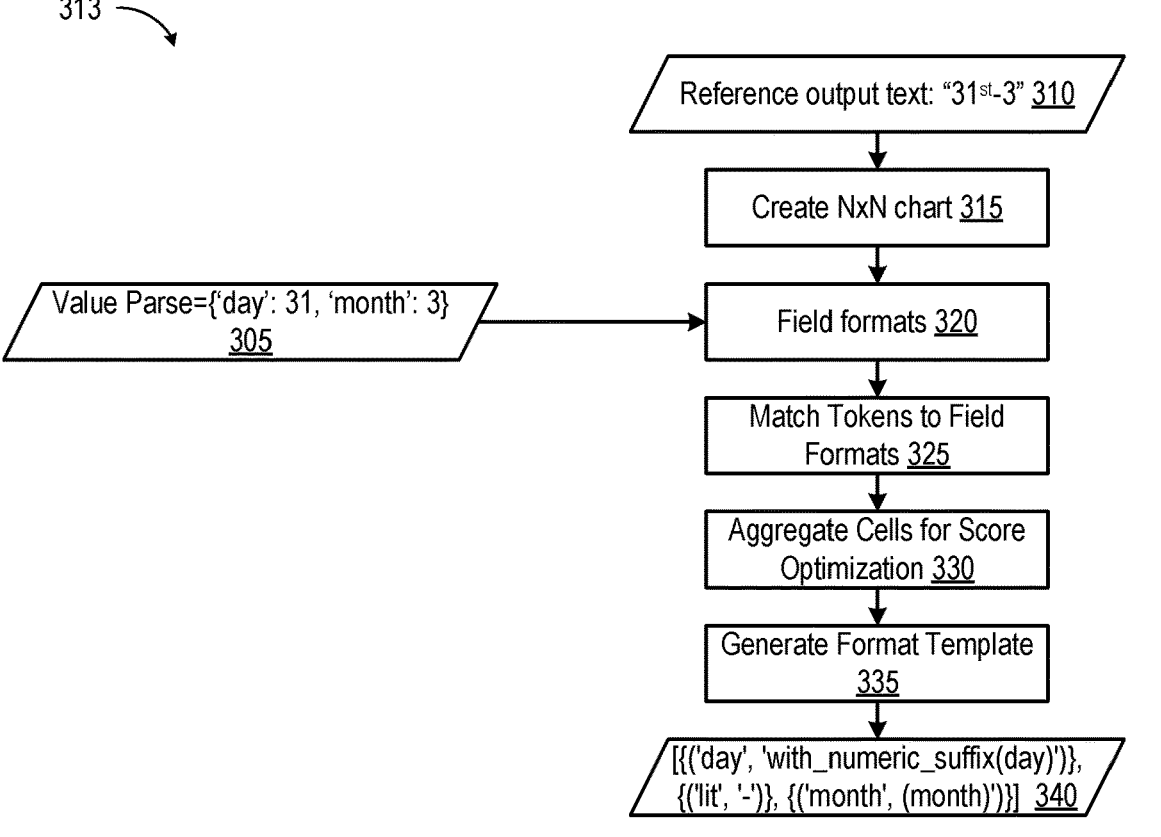
FIG. 3B is a flowchart 313 showing a method of generating a format template for a datatype.

FIG. 3B is a flowchart 313 showing a method of generating a format template for a datatype. Following the example of FIG. 3A, flowchart 313 assumes input text string 302 yields an unambiguous value parse {'day': 31, 'month': 03} for which the user has provided reference output text "31$^{st}$-3". The depicted process generates a format template, from the single value parse 305 and exemplar 310, that can be used to present subsequent value parses in the desired format.

The process creates an N×N table, where N is the length of the output text (315). In this example, output text "31$^{st}$-3" is six characters and yields the following Table 10. Each cell represents a token and is denoted as cell[i][j].

TABLE 10

| | | Valid and Invalid tokens for the reference output text "31st-3" | | | | |
|---|---|---|---|---|---|---|
| offset | 0 | 1 | 2 | 3 | 4 | 5 |
| 0 | valid token: "3" | valid token: "31" | valid token: "31s" | valid token: "31st" | valid token: "31st-" | valid token: "31st-3" |
| 1 | invalid token | valid token: "1" | valid token: "1s" | valid token: "1st" | valid token: "1st-" | valid token: "1st-3" |
| 2 | invalid token | invalid token | valid token: "s" | valid token: "st" | valid token: "st-" | valid token: "st-3" |
| 3 | invalid token | invalid token | invalid token | valid token: "t" | valid token: "t-" | valid token: "t-3" |
| 4 | invalid token | invalid token | invalid token | invalid token | valid token: "-" | valid token: "-3" |
| 5 | invalid token | invalid token | invalid token | invalid token | invalid token | valid token: "3" |

Next, field formats are generated for the value parse, Parse-1={'day': 31, 'month': 3} in this example (320). The possible field formatters for the "date" datatype are predefined in a library file. Each semantic field of the date datatype accepts a lexical set of related values. The possible formatted-field-tokens corresponding to Parse-1 are derived using the formatters in the library file. In this example, the possible (formatted-field-token, formatter) pairs for day: 31 are:

('31', 'day'),
('31', "left_pad('0', 2, day)"),
('31$^{st}$', 'with_numeric_suffix(day)')

The possible (formatted-field-token, formatter) pairs for 'month': 3 are:

('3', 'month'),
('03', "left_pad('0', 2,month)"),
('march', 'lowerCase(name(month))'),
('MARCH', 'upperCase(name(month))'),
('March', 'titleCase(name(month))'),
('mar', 'lowerCase(prefix(3, name(month)))'),
('MAR', 'upperCase(prefix(3, name(month)))'),
('Mar', 'titleCase(prefix(3, name(month)))')

The current input parse thus has three (formatted-field-token, formatter) pairs for day and eight for month, eleven in total.

Next, each valid token of Table 10 is compared with the eleven formatted-field tokens (325). In this example, matches are found in cell[0][0], cell[0][1], cell[0][3], and cell[5][5]. An initial score of 1.0 is applied to each matching cell. These findings are summarized in the following Table 11.

TABLE 11

| | | Field formatters for the matched tokens of "31st-3" and their scores | |
|---|---|---|---|
| cell [i][j] | Matched token | field formatters | Initial score |
| cell[0][0] | 3 | ('3', 'month') | 1.0 |
| cell[0][1] | 31 | ('31', 'day'), ('31', "left_pad('0', 2, day)") | 1.0 |
| cell[0][3] | 31st | ('31st', 'with_numeric_suffix(day)') | 1.0 |
| cell[5][5] | 3 | ('3', 'month') | 1.0 |

Table 12, below, shows another way to illustrate the data presented in Table 11. For every valid token that matches any available formatted-field-tokens, an entry of the form: (score, [{(field_name, formatter)}]) is made in the chart where field_name is the name of the field, and formatter the field formatter that matches with the token. There can be more than one field formatter for a valid token. If a match is found with more than one formatter, then the entry is of the form: (score, [{(field, formatter_1), (field, formatter_2) . . . (field, formatter_n)}]). If no match is found, the value remains None.

For example, consider cell[0][0] in the Table 11, which represents the token '3'. This token is matched with the formatted-field tokens of the eleven (formatted-field-token, formatter) pairs available for the input parse {'day': 31, 'month': 3}. The one matching pair; ('3', 'month'), is assigned a positive score 1.0 (default value), the matching field name and formatter ('month', 'month') in the cell. The cells of the initialization chart for format induction can be filled in any order.

TABLE 12

| | | Initial score calculation for the matched tokens of "31st-3" | | | | |
|---|---|---|---|---|---|---|
| offset | 0 | 1 | 2 | 3 | 4 | 5 |
| 0 | (1.0, [{('month', 'month')}]) | (1.0, [{('day', 'day'), ('day', "left_pad('0', 2, day)")}]) | None | (1.0, [{('day', 'with_numeric_suffix(day)')}]) | None | None |
| 1 | None | None | None | None | None | None |
| 2 | None | None | None | None | None | None |
| 3 | None | None | None | None | None | None |
| 4 | None | None | None | None | None | None |
| 5 | None | None | None | None | None | (1.0, [{('month', month')}]) |

The next step aggregates the cells of Table 12 to optimize the scores (330), the results of which are illustrated below in Table 13 below. (This process is similar to the manner in which Table 3, supra, was populated with best-score value parses.) Each cell of Table 12 is updated with a final score and used to calculate an optimal score. The process for updating the cells proceeds in order of the integer values indicated at the upper left of each cell under consideration, starting with cell[0][0] and ending with cell[0][5] as follows.

Update 1: Cell[0][0]: There is no update to this cell. The initial score of 1.0 is retained as the final score in the cell.

Update 2: Cell[1][1]: There is no update to this cell.

Update 3: Cell[0][1]: There is no update to this cell.

Update 4: Cell[2][2]: There is no update to this cell.

Update 5: Cell[1][2]: The token represented by this cell, token='1s', can be split into the following smaller substring pair(s): token='1' and token='s' which are represented by cells—cell[1][1] and cell[2][2]. Both these cells hold value None. So, no possible formatters. Since the possible substring pair doesn't contain any possible formatters, there is no update to this cell.

a. Calculate partial score for that cell, partial score=−[length(token)$^4$], partial score=−[length('1s')$^4$]=−(2$^4$)=−16.

b. Assign a literal formatter ("lit") for that token [{(field name, formatter)}]=[{("lit", '1s')}]. In case of literals, a 'literal formatter' is a special case where the token ('1s') itself is considered as the formatter.

c. Append the partial score to the formatter to get a format as: (partial score, [{(field name, formatter)}])=(−16, [{("lit", '1s')}]).

d. Compute total score=score of cell[0][0]+score of cell[1][2]=1.0+(−16)=−15.0.

e. Represent the combination of field formatters as a list. Merge every formatter in cell[0][0] with every formatter in cell[1][2]. Merges=[{('month', 'month')}, {('lit', '1s')}].

Pair 2: token='31' and token='s'. The pairs are represented by cells—cell[0][1] and cell[2][2]. The current value in cell[0][1]=(1.0, [{('day', 'day'), ('day', "left_pad('0', 2, day)")}]) and cell[2][2]=None. Since one of the values in the selected cell is None

TABLE 13

| offset | 0 | 1 | 2 | 3 | 4 | 5 |
|---|---|---|---|---|---|---|
| | Chart optimization using format induction for the output text "31st-3" | | | | | |
| 0 | 1<br>(1.0, [{('month', 'month')}]) | 3<br>(1.0, [{('day', 'day'), ('day', "left_pad('0', 2, day)")}]) | 6<br>(−4.0, [[{('day', "left_pad('0', 2, day)"), ('day', 'day')}, {('lit', 's')}]]) | 10<br>(1.0, [{('day', 'with_nu-meric_suf-fix(day)')}]) | 15<br>(−4.0, [[{('day', with_nu-meric_suf-fix(day)')}, {('lit', '-')}]]) | 21<br>(−12.0, [[{('day', 'with_num-eric_suf-fix(day)')}, {('lit', '-')}, {('month', 'month')}]]) |
| 1 | None | 2<br>None | 5<br>None | 9<br>None | 14<br>None | 20<br>(−46.0, [[{('lit', '1s')}, {('lit', 't')}, {('lit', '-')}, {('month', 'month')}]]) |
| 2 | None | None | 4<br>None | 8<br>None | 13<br>None | 19<br>(−31.0, [[{('lit', 's')}, {('lit', 't')}, {('lit', '-')}, {('month', month')}]]) |
| 3 | None | None | None | 7<br>None | 12<br>None | 18<br>(−14.0, [[{('lit', 't')}, {('lit', '-')}, {('month', 'month')}]]) |
| 4 | None | None | None | None | 11<br>None | 17<br>(−4.0, [{('lit', '-')}, {('month', 'month')}]]) |
| 5 | None | None | None | None | None | 16<br>(1.0, [{('month', 'month')}]) |

Update 6: Cell[0][2]: The value in this cell is None. The token represented by this cell, token='31s', can be split into the following smaller substring pair(s): Pair 1: cell[0][0] and cell[1][2]:token='3' and token='1s'; and Pair 2: cell[0][1] and cell[2][2]: token='31' and token='s'.

Pair 1: token='3' and token='1s'. The pairs are represented by cells-cell[0][0] and cell[1][2]. The current value in cell[0][0]=(1.0, [({('month', 'month')})]) and cell[1][2]=None. Since one of the values in the selected cell is None (Here, the cell with value None is cell[1][2]):

(Here, the cell with value None is cell[2][2]) the partial score is calculated as follows:

a. Calculate partial score for that cell. Partial score=−[length(token)$^4$], Partial score=−[length('s')$^4$]=−(1$^4$)=−1.

b. Assign a formatter for that token: [{(field name, formatter)}]=[{("lit", 's')}].

c. Append the partial score to the formatter to get a format as: (score, [{(field name, formatter)}])=(−1, [{("lit", 's')}]).

d. Compute total score=score of cell[0][1]+score of cell[2][2], score=1.0+(−1)=0.0.

e. Merge every formatter in cell[0][1] with every formatter in cell[2][2]. Merges=[[{('day', 'day'), ('day', "left_pad('0', 2, day)")}, {('lit', 's')}]]. Among the available pairs, choose the merges of the pairs with Best score. Here, Pair 2 has Best score=0.0. So the merges of that pair are considered. Final formatters=[[{('day', 'day'), ('day', "left_pad('0', 2, day)")}, {('lit', 's')}]]. If multiple pairs have the same Best score, all the merges of those Best scored pairs are considered as Final formatters.

Calculate length_cost=−(Number of sets of field formatters)$^2$=−(2)$^2$=−4, where length cost is an additional scoring mechanism to control (or discourage) the number of field formatters while determining the format template. Remove duplicate formatters in Final formatters if any. (Here, there are no duplicates.) Final formatters=Final formatters without duplicates=[[{('day', 'day'), ('day', "left_pad('0', 2, day)")}, {('lit', 's')}]]. Calculate the Final Score=Best score+Length_cost=0.0+(−4.0)=−4.0. Update the cell, Cell[0][2]=(Final score, Final formatters)=(−4.0, [[{('day', "left_pad('0', 2, day)"), ('day', 'day')}, {('lit', 's')}]]).

Update 7: Cell[3][3]: The value in this cell is None and the token represented by this cell, token='t', cannot be split into smaller substring pairs. So, there is no update to this cell.

Update 8: Cell[2][3]: The value in this cell is None, but the token represented by this cell, token='st', can be split into the following smaller substring pair(s): token='s' and token='t', which are represented by cells cell[2][2] and cell[3][3]. Both these cells hold value None. The possible substring pair lacks formatters so there is no update.

Update 9: Cell[1][3]: The value in this cell is None, but the token represented by this cell, token='1st', can be split into the following smaller substring pairs:

Pair 1: token='1' and token='st', which are represented by cells cell[1][1] and cell[2][3]. Both these cells hold value None so there are no formatters.

Pair 2: token='1s' and token='t', which are represented by cells cell[1][2] and cell[3][3]. Both these cells hold value None so there are no formatters or update.

Update 10: Cell[0][3]: The value in this cell is None so there is no update. The initial score of 1.0 is retained as the final score.

Update 11: Cell[4][4]: The value in this cell is None, but the token represented by this cell, token='-', cannot be split into smaller substring pairs. There is no update to this cell.

Update 12: Cell[3][4]: The value in this cell is None, but the token represented by this cell, token='t-', can be split into substring pairs token='t' and token='-', which are represented by cells cell[3][3] and cell[4][4]. Both these cells hold value None so there are no formatters or update for cell[3][4].

Update 13: Cell[2][4]: The value in this cell is None, but the token represented by this cell, token='st-', can be split into the following smaller substring pairs:

Pair 1: token='s' and token='t-', which are represented by cells cell[2][2] and cell[3][4]. Both these cells hold value None, so there are no formatters.

Pair 2: token='st' and token='-', which are represented by cells cell[2][3] and cell[4][4]. Both these cells hold value None, so there are no formatters.

Since neither pair contains formatters, there is no update to this cell.

Update 14: Cell[1][4]: The value in this cell is None, but the token represented by this cell, token='1$^{st}$-', can be split into the following smaller substring pairs:

Pair 1: token='1' and token='st-' are represented by cells cell[1][1] and cell[2][4], which hold the value None. There are no formatters.

Pair 2: token='1s' and token='t-' are represented by cells cell[1][2] and cell[3][4], which hold the value None. There are not formatters.

Pair 3: token='1st' and token='-' are represented by cells cell[1][3] and cell[4][4], which hold the value None. There are not formatters.

Since none of the possible substring pairs contain any formatters, there is no update to this cell.

Update 15: Cell[0][4]: The value in this cell is None but the token represented by this cell, token='31$^{st}$-', can be split into the following smaller substring pairs:

Pair 1: token='3' and token='1st-', which are represented by cell[0][0] and cell[1][4].

Pair 2: token='31' and token='st-', which are represented by cell[0][1] and cell[2] [4].

Pair 3: token='31s' and token='t-', which are represented by cell[0][2] and cell[3][4].

Pair 4: token='31$^{st}$' and token='-', which are represented by cell[0][3] and cell[4][4].

The update is like Update 6, supra. Cell[0][4]=(−4.0, [[{('day', 'with_numeric_suffix(day)')}, {('lit', '-')}]]).

Update 16: Cell[5][5]: The initial score of 1.0 is retained as the final score.

Update 17: Cell[4][5]: The value in this cell is None, but the token represented by this cell, token='−3', can be split into tokens '-' and '3', which are represented by cell[4][4] and cell[5][5]. The update is similar to Update 6. Refer Update 6 for detailed explanation. Update the cell, Cell[4][5]=(−4.0, [[{('lit', '-')}, {('month', 'month')}]]).

Update 18: Cell[3][5]: The value in this cell is None, but the token represented by this cell, token='t-3', can be split into the following smaller substring pairs:

Pair 1: token='t' and token='−3', which are represented by cell[3][3] and cell[4][5].

Pair 2: token='t-' and token='3', which are represented by cell[3][4] and cell[5][5].

The update is similar to Update 6. Update Cell[3][5]= (−14.0, [[{('lit', 't')}, {('lit', '-')}, {('month', 'month')}]]).

Update 19: Cell[2][5]: The value in this cell is None, but the token represented by this cell, token='st-3', can be split into the following smaller substring pairs:

Pair 1: token='s' and token='t-3' are represented by cell[2][2] and cell[3][5].

Pair 2: token='st' and token='−3' are represented by cell[2][3] and cell[4][5].

Pair 3: token='st-' and token='3' are represented by cell[2][4] and cell[5][5].

The update is similar to Update 6. Update cell[2][5]= (−31.0, [[{('lit', 's')}, {('lit', 't')}, {('lit', '-')}, {('month', 'month')}]]).

Update 20: Cell[1][5]: The value in this cell is None, but the token represented by this cell, token='1st-3' can be split into the following smaller substring pairs:

Pair 1: token='1' and token='st-3' are represented by cell[1][1] and cell[2][5].

Pair 2: token='1s' and token='t-3' are represented by cell[1][2] and cell[3][5].

Pair 3: token='1st' and token='−3' are represented by cell[1][3] and cell[4][5].

Pair 4: token='1st-' and token='3' are represented by cell[1][4] and cell[5][5].

The update is similar to Update 6. Update cell[1][5]= (−46.0, [[{('lit', '1s')}, {('lit', 't')}, {('lit', '-')}, {('month', 'month')}]]).

Update 21: Cell[0][5]: The value in this cell is None, but the token represented by this cell, token='31$^{st}$-3', can be split into the following smaller substring pairs:

Pair 1: token='3' and token='1st-3' are represented by cell[0][0] and cell[1][5].

Pair 2: token='31' and token='st-3' are represented by cell[0][1] and cell[2][5].

Pair 3: token='31s' and token='t-3' are represented by cell[0][2] and cell[3][5].

Pair 4: token='31$^{st}$' and token='−3' are represented by cell[0][3] and cell[4][5].

Pair 5: token='31$^{st}$-' and token='3' are represented by cell[0][4] and cell[5][5].

Pair 1: The current value in cell[0][0]=(1.0, [({('month', 'month')})]) and cell[1][5]=(−46.0, [[{('lit', '1s')}, {('lit', 't')}, {('lit', '-')}, {('month', 'month')}]]). The combined score=score of cell[0][0]+score of cell[1][5]= 1.0+(−46.0)=−45.0. Merging every formatter in cell[0][0] with every formatter in cell[1][5] gives: [{('month', 'month')}, {('lit', '1s')}, {('lit', 't')}, {('lit', '-')}, {('month', 'month')}]].

Pair 2: The merge process is like for Pair 1, supra. The score is −30.0 and merge=[{('day', "left_pad('0', 2, day)"), ('day', 'day')}, {('lit', 's')}, {('lit', 't')}, {('lit', '-')}, {('month', 'month')}].

Pair 3: The merge process is like for Pair 1, supra. The score is −18.0 and merge=[{('day', "left_pad('0', 2, day)"), ('day', 'day')}, {('lit', 's')}, {('lit', 't')}, {('lit', '-')}, {('month', 'month')}].

Pair 4: The merge process is like for Pair 1, supra. The score is −3.0 and merge=[{('day', 'with_numeric_suffix(day)')}, {('lit', '-')}, {('month', 'month')}].

Pair 5: The merge process is like for Pair 1, supra. The score is −3.0 and merge=[{('day', 'with_numeric_suffix(day)')}, {('lit', '-')}, {('month', 'month')}].

Among the 5 available pairs, choose the merge of the pairs with Best score. Here, Pair 4 and Pair 5 each have the Best score (−3.0). The merges of both those pairs are therefore considered. The best score=−3.0

Final formatters=

[[{('day', 'with_numeric_suffix(day)')}, {('lit', '-')}, {('month', 'month')}], and

[{('day', 'with_numeric_suffix(day)')}, {('lit', '-')}, {('month', 'month')}]]

If multiple pairs have the same Best score, all the merges of those Best scored pairs are considered as Final formatters. Before calculating the length_cost, duplicates are removed.

Calculate length_cost

Length_cost=−(Number of sets of field formatters)$^2$

Length_cost=−(3)$^2$=−9

Remove duplicate formatters in Final formatters

Final formatters=Final formatters without duplicates

Final formatters=[[{('day', 'with_numeric_suffix(day)')}, {('lit', '-')}, {('month', 'month')}]]

Calculate the Final Score $$Final\ score = Best\ score + Length\_cost$$

$$Final\ score = -3.0 + (-9) = -12.0$$

Update the cell, Cell[0][5]

cell[0][5]=(Final score, Final formatters)

cell[0][5]=(−12.0, [[{('day', 'with_numeric_suffix (day)')}, {('lit', '-')}, {('month', 'month')}]])

Cell[0][5] contains the optimal final score, which indicates the best combinations of field formats with respect to single value parse and is represented as (−12.0, [[{('day', 'with_numeric_suffix(day)')}, {('lit', '-')}, {('month', 'month')}]]). The format template and score are thus [{('day', 'with_numeric_suffix(day)')}, {('lit', '-')}, {('month', (month)')}] and −12.0. In step 335, this entry is used to generate the format template (340). In this example, the format template is [{('day', 'with_numeric_suffix (day)')}, {('lit', '-')}, {('month', (month)')}].

Figure 4:
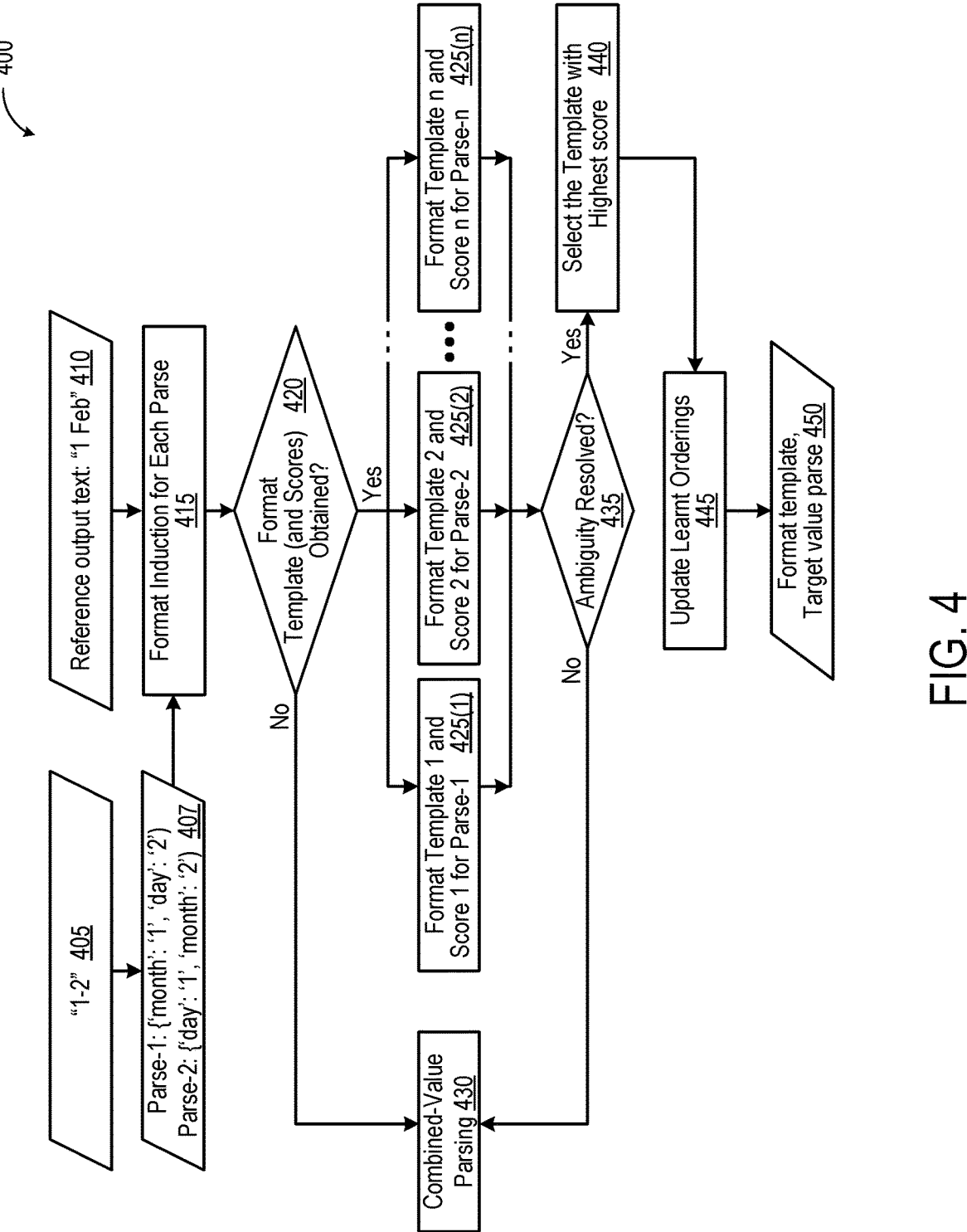
FIG. 4 is a flowchart 400 illustrating how format induction can be extended from the process of FIG. 3 to resolve ambiguities between value parses.

FIG. 4 is a flowchart 400 illustrating how format induction can be extended from the process of FIG. 3 to resolve ambiguities between value parses. Let the input text 405 be "1-2" and the reference datatype "date". Applying potential field identification and value-score optimization in the manner of FIG. 1 provides two identically scored optimal-score value parses 407: Parse-1: {'month': '1', 'day': '2'} and Parse-2: {'day': '1', 'month': '2'}. Both parses merit a score of 1.0 for each of their single-digit month and day values, for a total score of 2.0. Reference output text "1 Feb" (410) specifies a desired date format and aids in resolving the ambiguity between the identically scored parses 407.

Format induction, as detailed in connection with FIG. 3, is applied to each value parse 407 (415). Like the example from Table 10, output text "1 Feb" is tokenized into an N×N chart, illustrated in Table 14 below, where N is the character length of the output text.

TABLE 14

| | | | | | |
|---|---|---|---|---|---|
| Valid and Invalid tokens for the reference output text "1 Feb" | | | | | |
| offset | 0 | 1 | 2 | 3 | 4 |
| 0 | valid token: "1" | valid token: "1" | valid token: "1 F" | valid token: "1 Fe" | valid token: "1 Feb" |
| 1 | invalid token | valid token: " " | valid token: "F" | valid token: "Fe" | valid token: "Feb" |
| 2 | invalid token | invalid token | valid token: "F" | valid token: "Fe" | valid token: "Feb" |
| 3 | invalid token | invalid token | invalid token | valid token: "e" | valid token: "eb" |
| 4 | invalid token | invalid token | invalid token | invalid token | valid token: "b" |

The next steps are performed for each of the ambiguous value parses, Parse-1 and Parse-2 in this example. Per decision 420, if none of the parses produces a format template, then the process shifts to combined-value parsing 430 to resolve the ambiguity. Combined-value parsing is detailed below. Format induction 415 can yield one or more formats templates, however, that can be used to resolve value-parse ambiguity. The following discussion details how value parses Parse-1 and Parse-2 yield respective value-scored format templates 425(1) and 425(2). A third format template 425(n) illustrates that the number of format templates can be greater.

Beginning with Parse-1, the possible formatted-field-tokens are derived using the formatters in the library file and given here:

The possible (formatted-field-token, formatter) pairs for day: '2' are:

('2', 'day'), ('02', "left_pad('0', 2, day)"), ('2$^{nd}$', 'with_numeric_suffix(day)')

The possible (formatted-field-token, formatter) pairs for month:'1' are:

('1', 'month'), ('01', "left_pad('0', 2, month)"), ('january', 'lowerCase(name(month))'), ('JANUARY', 'upperCase(name(month))'), ('January', 'titleCase(name(month))'), ('jan', 'lowerCase(prefix(3, name(month)))'), ('JAN', 'upperCase(prefix(3, name(month)))'), ('Jan', 'titleCase(prefix(3, name(month)))')

Next, the field formats from Parse-1 are mapped to reference output text "1 Feb". Each valid token in the chart is matched against the above field formatters. As illustrated in the following Table 15, only cell[0][0] includes a matching entry.

TABLE 15

| | | Tokens matched to field formatters of Parse-1 | | | |
|---|---|---|---|---|---|
| offset | 0 | 1 | 2 | 3 | 4 |
| 0 | valid token: "1" | valid token: "1" | valid token: "1 F" | valid token: "1 Fe" | valid token: "1 Feb" |
| 1 | invalid token | valid token: " " | valid token: "F" | valid token: "Fe" | valid token: "Feb" |
| 2 | invalid token | invalid token | valid token: "F" | valid token: "Fe" | valid token: "Feb" |
| 3 | invalid token | invalid token | invalid token | valid token: "e" | valid token: "eb" |

TABLE 15-continued

| | | Tokens matched to field formatters of Parse-1 | | | |
|---|---|---|---|---|---|
| offset | 0 | 1 | 2 | 3 | 4 |
| 4 | invalid token | invalid token | invalid token | invalid token | valid token: "b" |

Table 16, below, shows the one matching cell from Table 15, a match for the token "1" with the month field formatter. An initial score of 1.0 is assigned to cell [0][0].

TABLE 16

| | Scored field formatter for the matched token with Parse-1 | | |
|---|---|---|---|
| cell | Matched token | field formatters | Initial score |
| [0][0] | 1 | ('1', 'month') | 1.0 |

For every possible valid token, if the token matches any of the available formatted-field-tokens, an entry of the form: score, [{(field_name, formatter)}]) is made in the chart where field_name is the name of the field, and formatter being the field formatter that matches with the token. In this case, for cell[0][0] there is one matching (formatted-field-token, formatter) pair, ('1', 'month'). An entry is thus made in cell[0][0] (shown in Table 17) that contains a positive score 1.0 (default value) and the matching field name and formatter ('month', 'month').

TABLE 17

| | | Initial score calculation for the matched tokens with Parse-1 | | | |
|---|---|---|---|---|---|
| offset | 0 | 1 | 2 | 3 | 4 |
| 0 | (1.0, [{('month', 'month')}]) | None | None | None | None |
| 1 | None | None | None | None | None |
| 2 | None | None | None | None | None |
| 3 | None | None | None | None | None |
| 4 | None | None | None | None | None |

A score and format template are calculated using the process detailed above to aggregate the cells of Table 12 to those of Table 13. That process is not repeated here, but the resulting calculations are presented below in Table 18.

TABLE 18

| | | Chart optimization for the reference output text "1 Feb" with respect to Parse-1 | | | |
|---|---|---|---|---|---|
| offset | 0 | 1 | 2 | 3 | 4 |
| 0 | (1.0, [{('month', 'month')}]) | (−4.0, [[{('month', 'month')}, {('lit', ' ')}]]) | (−14.0, [[{('month', 'month')}, {('lit', ' ')}, {('lit', 'F')}]]) | (−31.0, [[{('month', 'month')}, {('lit', ' ')}, {('lit', 'F')}, {('lit', 'e')}]]) | (−46.0, [[{('month', 'month')}, {('lit', ' ')}, {('lit', 'F')}, {('lit', 'eb')}]]) |
| 1 | None | None | None | None | None |
| 2 | None | None | None | None | None |
| 3 | None | None | None | None | None |
| 4 | None | None | None | None | None |

The format template and optimal final score for Parse-1 are available in cell[0][4] of Table 18. The best combination of field formats with respect to Parse-1 is represented as:

(–46.0, [[{('month', 'month')}, {('lit', ' ')}, {('lit', 'F')}, {('lit', 'eb')}]])

The Parse-1 score after applying format induction is denoted as: parse1_FI score=–46.0. These data are represented as 425(1) in FIG. 4. In the above format template, 'F' and 'eb' are literals and there is no match with the fields of Parse-1. Hence, it results in a partially matched template with a high negative score.

Next, the format induction algorithm is repeated for Parse-2: ({'day': '1', 'month': '2'} score: 2.0) using the output text "1 Feb". The possible (formatted-field-token, formatter) pairs for day: '1' are:

('1', 'day'),
('01', "left_pad('0', 2, day)"),
('1$^{st}$', 'with_numeric_suffix(day)')

The possible (formatted-field-token, formatter) pairs for month:'2' are:

('2', 'month'),
('02', "left_pad('0', 2,month)"),
('february', 'lowerCase(name(month))'),
('FEBRUARY', 'upperCase(name(month))'),
('February', 'titleCase(name(month))'),
('feb', 'lowerCase(prefix(3, name(month)))'),
('FEB', 'upperCase(prefix(3, name(month)))'),
('Feb', 'titleCase(prefix(3, name(month)))')

Next, these field formats are mapped to the reference output text. Each valid token in Table 14 is matched against the field formats. The result is presented in Table 19.

TABLE 19

| | | | | | |
|---|---|---|---|---|---|
| Tokens that match with field formatters of Parse-2 | | | | | |
| offset | 0 | 1 | 2 | 3 | 4 |
| 0 | valid token: "1" | valid token: "1" | valid token: "1 Fe" | valid token: "1 Fe" | valid token: "1 Feb" |
| 1 | invalid token | valid token: " " | valid token: "F" | valid token: "Fe" | valid token: "Feb" |
| 2 | invalid token | invalid token | valid token: "F" | valid token: "Fe" | valid token: "Feb" |
| 3 | invalid token | invalid token | invalid token | valid token: "e" | valid token: "eb" |
| 4 | invalid token | invalid token | invalid token | invalid token | valid token: "b" |

The tokens that match with the field formatters for Parse-2: {'day': '1', 'month': '2'} score: 2.0 are listed below in Table 20. In cell[0][0], there is a match for the token "1" with the day field formatter and in cell[2][4], there is a match with the month field formatter. An initial score of 1.0 is assigned to each matching cell[0][0] and cell[2][4].

TABLE 20

| | | | |
|---|---|---|---|
| Field formatters for the matched tokens with Parse-2 and their scores | | | |
| cell [i][j] | Matched token | field formatters | Initial score |
| [0][0] | 1 | ('1', 'day') | 1.0 |
| [2][4] | Feb | ('Feb', 'titleCase(prefix(3, name(month)))') | 1.0 |

For every possible valid token, if the token matches any of the available formatted-field-tokens, an entry of the form (score, [{(field_name, formatter)}]) is made in the chart. For cell[0][0], there is one matching (formatted-field-token, formatter) pair that is ('1', 'day'). An entry is made in cell[0][0] (shown in Table 21) that contains an initial positive score 1.0 (default value), and the matching field name and formatter ('day', 'day') in the cell. For cell[2][4], there is one matching pair, that is, ('Feb', 'titleCase(prefix(3, name(month)))'). An entry is made in cell[2][4] with an initial score 1.0 and the matching field name and formatter ('month', 'titleCase (prefix(3, name(month)))').

TABLE 21

| | | | | | |
|---|---|---|---|---|---|
| Initial score calculation for the matched tokens with Parse-2 | | | | | |
| offset | 0 | 1 | 2 | 3 | 4 |
| 0 | (1.0, [{('day', 'day')}]) | None | None | None | None |
| 1 | None | None | None | None | None |
| 2 | None | None | None | None | (1.0, [{('month', 'titleCase(prefix(3, name(month)))')}]) |
| 3 | None | None | None | None | None |
| 4 | None | None | None | None | None |

The steps for calculating the score and the format template detailed previously and omitted here for brevity. The final results at the end of optimization are given in Table 22.

TABLE 22

| | | | | | |
|---|---|---|---|---|---|
| Chart optimization for the output text "1 Feb" with respect to Parse-2 | | | | | |
| offset | 0 | 1 | 2 | 3 | 4 |
| 0 | (1.0, [{('day', 'day')}]) | (–4.0, [[{('day', 'day')}, {('lit', ' ')}]]) | (–14.0, [[{('day', 'day')}, {('lit', ' ')}, {('lit', 'F')}]]) | (–31.0, [[{('day', 'day')}, {('lit', ' ')}, {('lit', 'F')}, {('lit', 'e')}]]) | (–12.0, [[{('day', 'day')}, {('lit', ' ')}, {('month', 'titleCase(prefix(3, name(month)))')}]]) |
| 1 | None | None | None | None | (–4.0, [[{ ('lit', "")}, { ('month', titleCase(prefix(3, name(month)))') } ]]) |

TABLE 22-continued

| | | Chart optimization for the output text "1 Feb" with respect to Parse-2 | | |
| --- | --- | --- | --- | --- |
| offset | 0 | 1 | 2 | 3 | 4 |
| 2 | None | None | None | None | (1.0, [{ ('month', 'titleCase(prefix(3, name(month)))')}]) |
| 3 | None | None | None | None | None |
| 4 | None | None | None | None | None |

With respect to Parse-2, the format template and the optimal score is available in cell[0][4] of Table 22. These represent the best combinations of field formats with respect to Parse-2 and are represented as:

(−12.0, [[{('day', 'day')}, {('lit', ' ')}, {('month', 'title-Case(prefix(3, name(month)))')}]])

The Parse-2 score after applying format induction is denoted as: parse2_FI score=−12.0. These data are depicted as 425(2) in FIG. 4.

Per decision 435, if the ambiguity is not resolved by the scoring of templates 425, the process transitions to combined-value parsing 430. In this example, however, template 425(2) for Parse-2 has the highest score and is thus selected (440). The highest optimal score=max(parse1_FI score, parse2_FI score)=max(−46.0, −12.0)=−12.0, where parse1_FI score indicates the Parse-1 Format Induction (FI) score and parse2_FI score indicates the Parse-2 FI score. There being but one format template with the highest optimal score (−12.0), ambiguity is resolved by choosing the format template of Parse-2 and the discarding Parse-1 template. The resultant template for the parse {"day": 1, "month": 2} is therefore (day, " ", titleCase(prefix(3, name(month)))). The learnt orderings are updated 445 and the chosen format template 425(2) and corresponding target value parse are output (450).

Figure 5:
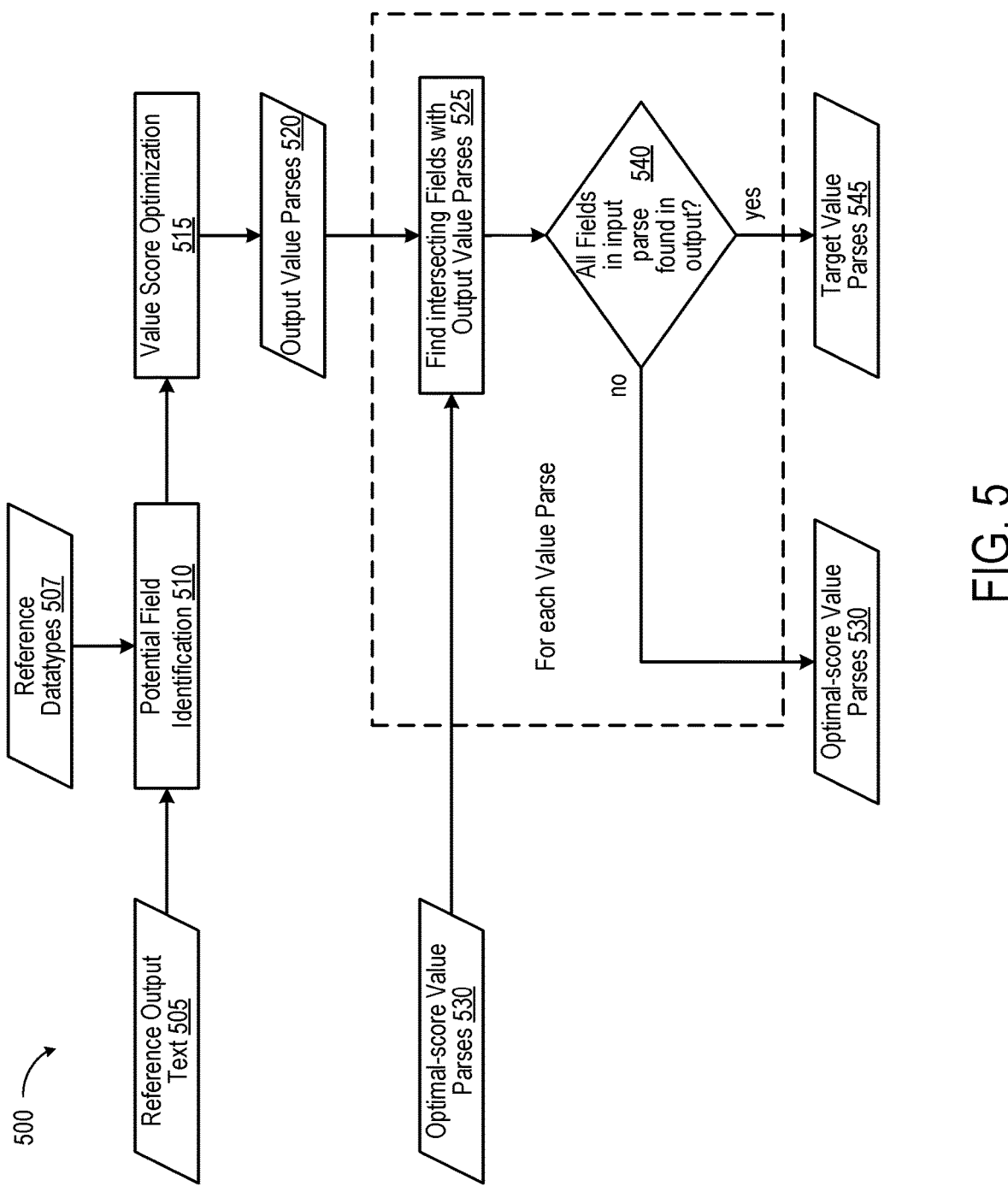
FIG. 5 is a flowchart 500 depicting a process for combined-value parsing, which can be applied to resolve value-parse ambiguity that is not resolved by format induction.

FIG. 5 is a flowchart 500 depicting a process for combined-value parsing, which can be applied to resolve value-parse ambiguity that is not resolved by format induction. Reference output text 505 is parsed, optionally with reference datatypes 507, using the steps of potential field identification 510 and value-score optimization 515 to produce one or more output value parses 520. These steps can be performed as noted previously. Next, at 525, each output value parse 520 is compared with each of multiple optimal-score value parses 530 from e.g. step 208 of FIG. 2 to select a parse for which all fields match. Per decision 540, a match implies that ambiguity is resolved and the respective output value parse from parses 520 becomes the target value parse 545 and is used to update the learnt orderings (e.g. as in 230 of FIG. 2). If a match is not found, then an empty set is returned and optimal-score value parses 530 are passed to a neighboring-parses stage for further consideration.

Figure 6:
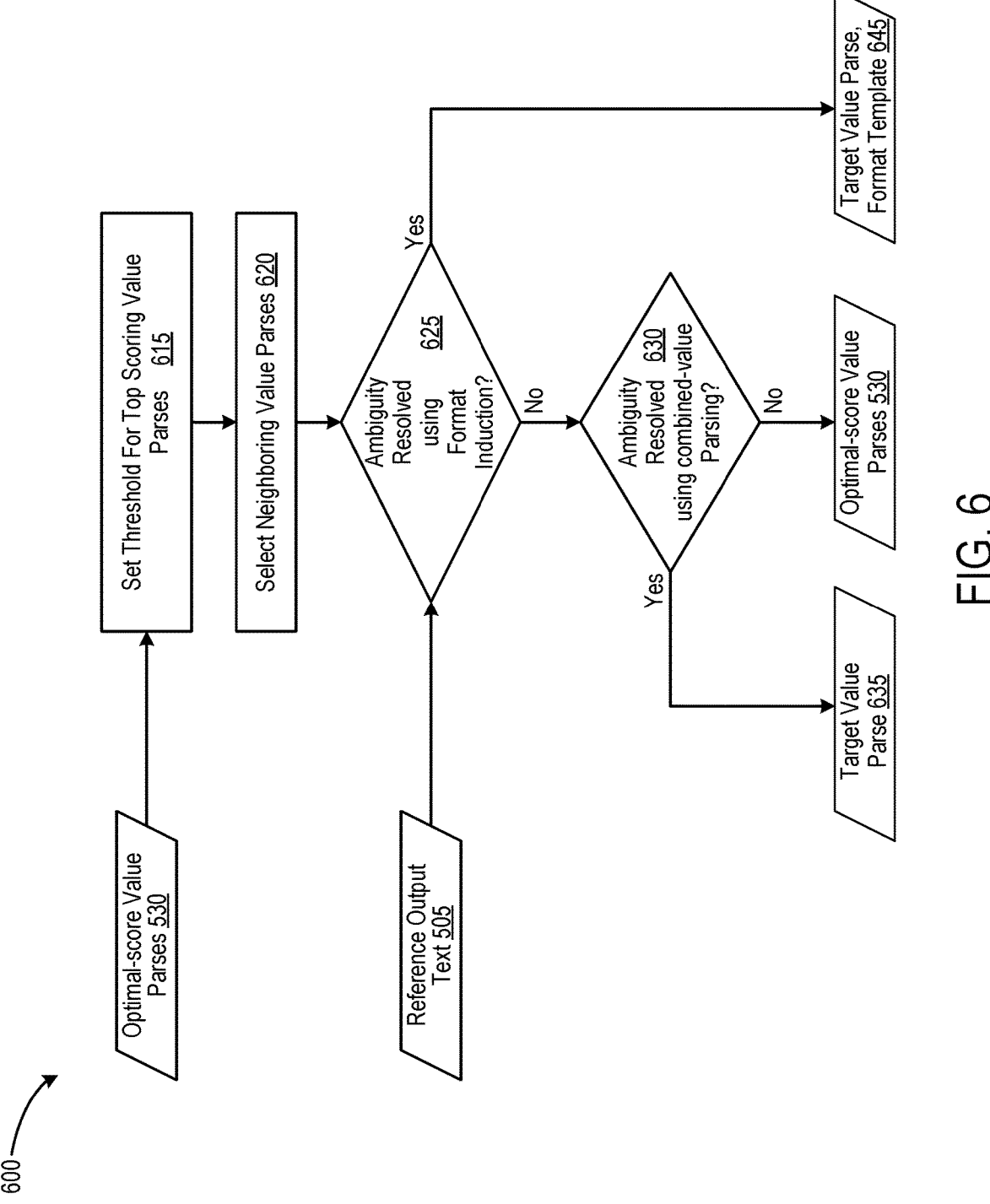
FIG. 6 is a flowchart 600 depicting a process for disambiguating neighboring value parses, a concept introduced in connection with decision 232 of FIG. 2.

FIG. 6 is a flowchart 600 depicting a process for disambiguating neighboring value parses, a concept introduced in connection with decision 232 of FIG. 2. Had ambiguity been resolved either through format induction or combined-value parsing, then the highest-scored value parse would have been used to update the learnt orderings. Otherwise, all optimal-score value parses 530 are returned as final output indicating that ambiguity is still not resolved.

In step 615, a threshold is set to select the neighboring value parses whose scores lie close to the highest-scores of the optimal-score value parses. The threshold selects the top n (where n denotes beam width) neighboring value parses with the highest scores (up to 200 highest scored value parses are considered). The neighboring value parses are selected (620) and they, with reference output text 505, are provided to the format-induction algorithm detailed above. All possible field formats are generated for the neighboring value parses. Per decision 625, if the field formats of the neighboring value parses match with the format of reference output text 505, then ambiguity is resolved and a target value parse and a format template is obtained (645). Otherwise, the neighboring value parses are treated to combined-value parsing. Reference output text 505 is parsed using the steps of potential field identification and value-score optimization to obtain an output value parse for comparison with each neighboring value parse. Per decision 630, if the fields of the output value parse match those of one or more neighboring value parses, then the highest-scored of the matching neighboring value parses is the target value parse 635 and ambiguity is resolved. Target value parse 635 can then be used to update the learnt orderings. Otherwise, all the input optimal-score value parses 530 are returned as final output indicating that ambiguity remains unresolved.

Figure 7:
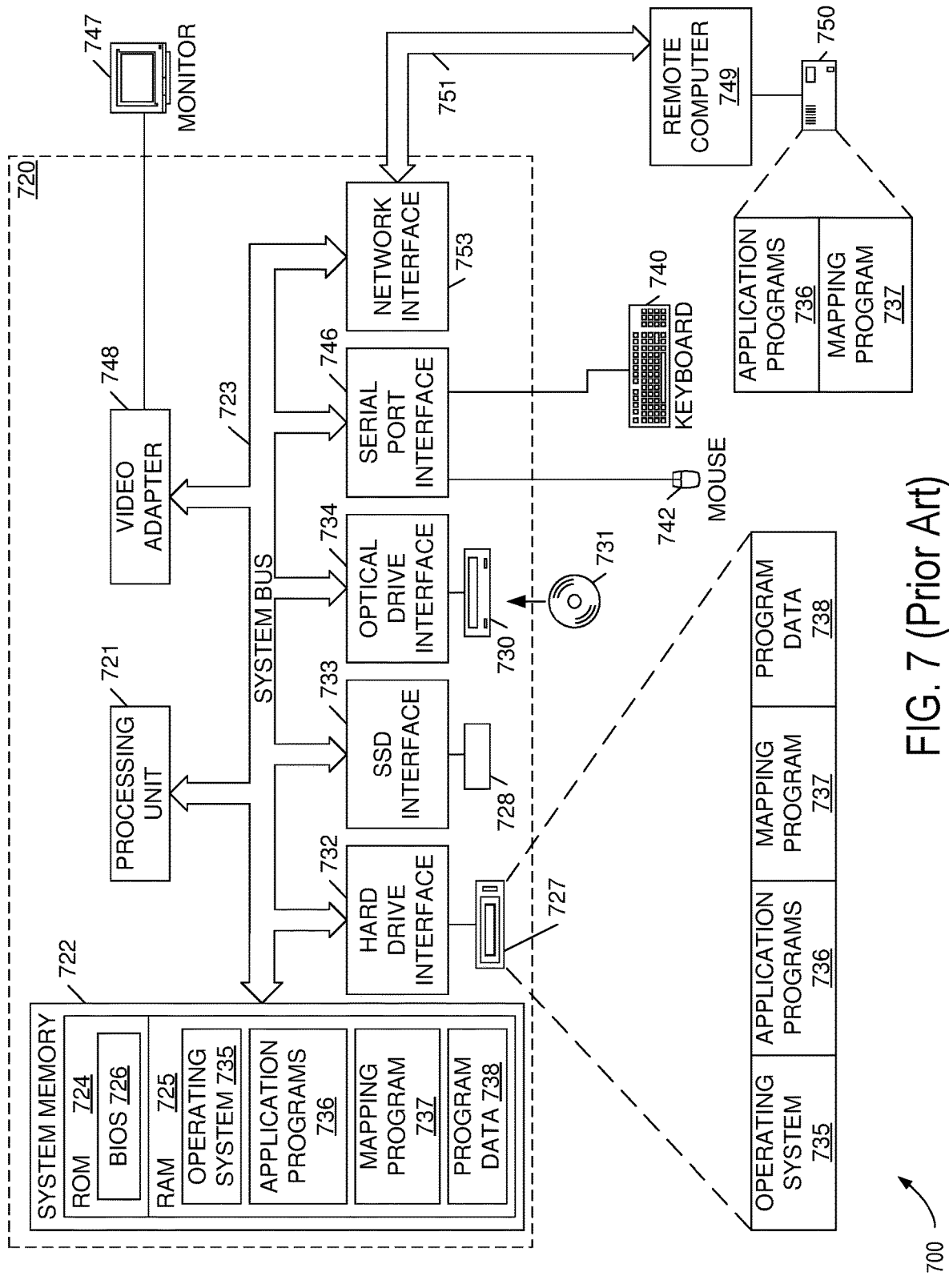
FIG. 7 (prior art) depicts a general-purpose computing system 700 that can serve as a client or a server depending on the program modules and components included.

FIG. 7 (prior art) depicts a general-purpose computing system 700 that can serve as a client or a server depending on the program modules and components included. One or more computers of the type depicted in computing system 700 can be configured to support value-direction parsing as detailed above. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 700 includes a conventional computer 720, including a processing unit 721, a system memory 722, and a system bus 723 that couples various system components including the system memory to the processing unit 721. The system bus 723 may be any of several types of bus structures, including a memory bus or memory controller, a peripheral bus, and a local bus using any of a variety of bus architectures. The system memory includes read only memory (ROM) 724 and random-access memory (RAM) 725. A basic input/output system 726 (BIOS), containing the basic routines that help to transfer information between elements within the computer 720, such as during start-up, is stored in ROM 724. The computer 720 further includes a hard disk drive 727 for reading from and writing to a hard disk, not shown, a solid-state drive 728 (e.g. NAND flash memory), and an optical disk drive 730 for reading from or writing to an optical disk 731 (e.g., a CD or DVD). The hard disk drive 727 and optical disk drive 730 are connected to the system bus 723 by a hard disk drive interface 732, an SSD interface 733, and an optical drive interface 734, respectively. The drives and their associated computer-readable media provide nonvolatile storage of computer readable instructions, data structures, program modules and other data for computer 720. Other types of computer-readable media can be used.

Program modules may be stored on disk drive 727, solid state disk 728, optical disk 731, ROM 724 or RAM 725, including an operating system 735, one or more application programs 736, other program modules 737, and program data 738. An application program 736 can used other elements that reside in system memory 722 to perform the processes detailed above.

A user may enter commands and information into the computer 720 through input devices such as a keyboard 740 and pointing device 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port, universal serial bus (USB), or various wireless options. A monitor 747 or other type of display device is also connected to the system bus 723 via an interface, such as a video adapter 748. In addition to the monitor, computers can include or be connected to other peripheral devices (not shown), such as speakers and printers.

The computer 720 may operate in a networked environment using logical connections to one or more remote computers, such as a remote computer 749 with local storage 750. The remote computer 749 may be another computer, a server, a router, a network PC, a peer device, or other common network node, and typically includes many or all of the elements described above relative to the computer 720. The logical connections depicted in FIG. 7 include a network connection 751, which can support a local area network (LAN) and/or a wide area network (WAN). Such networking environments are commonplace in offices, enterprise-wide computer networks, intranets, and the Internet.

Computer 720 includes a network interface 753 to communicate with remote computer 749 via network connection 751. In a networked environment, program modules depicted relative to the computer 720, or portions thereof, may be stored in the remote memory storage device. It will be appreciated that the network connections shown are exemplary and other means of establishing a communication link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. section 112(f).

What is claimed is:

1. A method of parsing a text string of characters, on a computing system that includes at least one processor and memory, to produce a target value parse with semantic fields, including a first semantic field and a second semantic field:

extracting tokens from the text string using the at least one processor, the tokens including every possible combination of adjacent characters in a direction of the text string;

applying, by the at least one processor, field constraints to each of the tokens to produce potential field values for the first semantic field and the second semantic field;

applying, by the at least one processor, scores to each of the potential field values;

ordering a first set of the potential field values in a first value parse;

combining the scores applied to the first set of the potential field values to obtain a first parse score for the first value parse;

ordering a second set of the potential field values in a second value parse; and combining the scores applied to the second set of the potential field values to obtain a second parse score for the second value parse; and selecting one of the first value parse and the second value parse responsive to the first parse score and the second parse score, wherein the first parse score equals the second parse score, the method further comprising disambiguating the first value parse from the second value parse responsive to the first parse score and the second parse score;

wherein the disambiguating comprises:

assigning a datatype to the first value parse and the second value parse;

applying a first bias to the scores applied to the first set of the potential field values;

updating the first parse score responsive to the first bias;

applying a second bias to the scores applied to the second set of the potential field values;

updating the second parse score responsive to the second bias;

wherein the first bias and the second bias favor an order of the first semantic field relative to the second semantic field; and selecting between the updated first parse score and the updated second parse score to disambiguate between the first value parse and the second value parse of the datatype.

2. The method of claim 1, further comprising selecting a first of the potential field values for the first semantic field and a second of the potential field values for the second semantic field based on the scores.

3. The method of claim 2, wherein the potential field values for the first semantic field and the second semantic field comprise mutually exclusive combinations of the potential field values, the method further comprising calculating, from the scores in each of the combinations of the potential field values, a combined score.

4. The method of claim 3, wherein the selecting is based on at least one of comparing and optimizing the combined scores of the combinations.

5. The method of claim 1, further comprising:

receiving structured text with a first reference field value and a second reference field value;

selecting the first semantic field for the target value parse from the first reference field value; and selecting the second semantic field for the target value parse from the second reference field value.

6. The method of claim 1, wherein applying one of the scores to one of the potential field values comprises calculating a square of a number of characters in the one of the potential field values.

7. The method of claim 1, wherein the target value parse with semantic fields comprises a data type.

8. The method of claim 1, wherein the field constraints comprise value constraints on the potential field values for the first semantic field.

9. The method of claim 8, wherein the field constraints further comprise second value constraints on the potential field values for the second semantic field.

10. The method of claim 1, wherein the disambiguating comprises:

receiving a reference output specifying a first value of the first semantic field and a second value of the second semantic field;

deriving a template from the reference output, the template including the first semantic field and the second semantic field in a field order;

comparing the template with the first value parse and the second value parse; and selecting one of the first value parse and the second value parse responsive to the comparing.

11. The method of claim 10, further comprising:

receiving a second text string;

extracting second tokens from the second text string;

applying the field constraints to the second tokens to produce second potential field values; and applying the template to the second potential field values to produce a second target value parse.

12. The method of claim 1, wherein the disambiguating comprises:

extracting reference field formats from a reference;

comparing field formats of the first value parse and the second value parse with the reference field formats; and selecting one of the field formats of the first value parse and the second value parse as a target value parse responsive to the comparing.

13. The method of claim 1, wherein the characters include a delimiter and at least two of the tokens include the delimiter.

14. The method of claim 13, wherein the delimiter is a dash or a slash separating the first of the potential field values from the second of the potential field values.

15. A method of parsing a text string of characters, on a computing system that includes at least one processor and memory, to produce a target value parse with semantic fields, including a first semantic field and a second semantic field:

extracting tokens from the text string using the at least one processor, the tokens including every possible string of at least one of the characters along a direction of the text string;

applying, by the at least one processor, field constraints to each of the tokens to produce potential field values for the first semantic field and the second semantic field;

applying, by the at least one processor, scores to each of the potential field values;

ordering a first set of the potential field values in a first value parse;

combining the scores applied to the first set of the potential field values to obtain a first parse score for the first value parse;

ordering a second set of the potential field values in a second value parse;

combining the scores applied to the second set of the potential field values to obtain a second parse score for the second value parse; and selecting one of the first value parse and the second value parse responsive to the first parse score and the second parse score, wherein the first parse score equals the second parse score, the method further comprising disambiguating the first value parse from the second value parse responsive to the first parse score and the second parse score;

wherein the first value parse is a maximum value parse, and wherein the disambiguating comprises grouping the first and second value parses with additional value parses that lie within a threshold of the maximum value parse.

* * * * *